(12) United States Patent
Neil

(10) Patent No.: US 9,007,497 B2
(45) Date of Patent: Apr. 14, 2015

(54) THREE-MIRROR ANASTIGMAT WITH AT LEAST ONE NON-ROTATIONALLY SYMMETRIC MIRROR

(75) Inventor: Iain A. Neil, Massagno (CH)

(73) Assignee: Media Lario S.R.L., Bosisio Parini (LC) (IT)

( * ) Notice: Subject to any disclaimer, the term of this patent is extended or adjusted under 35 U.S.C. 154(b) by 429 days.

(21) Appl. No.: 12/806,350

(22) Filed: Aug. 11, 2010

(65) Prior Publication Data

US 2012/0038812 A1 Feb. 16, 2012

(51) Int. Cl.
*H04N 9/097* (2006.01)
*G02B 17/06* (2006.01)
*H04N 5/222* (2006.01)
*H04N 5/225* (2006.01)

(52) U.S. Cl.
CPC ............ *G02B 17/0636* (2013.01); *H04N 9/097* (2013.01); *H04N 5/2259* (2013.01)

(58) Field of Classification Search
CPC . H04N 5/23296; H04N 9/097; H04N 5/2259; H04N 5/2258; H04N 5/2328; H04N 5/23287; G02B 7/00
USPC ............ 348/259, 333.08, 335, 340, 343, 344, 348/369
See application file for complete search history.

(56) References Cited

U.S. PATENT DOCUMENTS

| | | | | |
|---|---|---|---|---|
| 4,226,501 A * | 10/1980 | Shafer | ............................ | 359/366 |
| 4,240,707 A * | 12/1980 | Wetherell et al. | ............. | 359/859 |
| 4,265,510 A * | 5/1981 | Cook | ............................. | 359/366 |
| 4,598,981 A * | 7/1986 | Hallam et al. | ................ | 359/366 |
| 4,642,740 A * | 2/1987 | True | ............................. | 362/268 |
| 4,804,258 A * | 2/1989 | Kebo | ............................ | 359/366 |
| 4,834,517 A | 5/1989 | Cook | | |
| 5,287,218 A * | 2/1994 | Chen | ............................ | 359/365 |
| 5,640,283 A * | 6/1997 | Warren | ......................... | 359/859 |
| 5,880,834 A * | 3/1999 | Chrisp | .......................... | 356/328 |
| 6,016,220 A | 1/2000 | Cook | | |
| 6,100,974 A * | 8/2000 | Reininger | ..................... | 356/300 |
| 6,356,388 B1 * | 3/2002 | Geyl | ............................. | 359/366 |
| 6,970,286 B1 * | 11/2005 | Kunick | ......................... | 359/366 |
| 7,119,969 B1 * | 10/2006 | Amon et al. | ..................... | 359/722 |
| 7,616,378 B2 * | 11/2009 | Wang | ........................... | 359/618 |
| 7,643,128 B2 * | 1/2010 | Harned et al. | ................... | 355/66 |
| 8,154,712 B2 * | 4/2012 | Kunick | ......................... | 356/5.01 |
| 2006/0119951 A1 * | 6/2006 | McGuire, Jr. | ................. | 359/630 |
| 2006/0209302 A1 * | 9/2006 | Sasaki | ........................... | 356/369 |
| 2009/0314646 A1 | 12/2009 | Neil et al. | | |
| 2011/0083742 A1 * | 4/2011 | Munro | ........................ | 136/259 |
| 2013/0010352 A1 * | 1/2013 | Chan et al. | .................... | 359/351 |
| 2013/0050671 A1 * | 2/2013 | Mann et al. | ..................... | 355/67 |

FOREIGN PATENT DOCUMENTS

JP 2000-081573 * 3/2000 ............. G02B 17/08

OTHER PUBLICATIONS

Nariai et al., "Three-mirror anastigmat telescope with unvignetted flat focal plane," Publ. Astron. Soc. Japan 57, 391-397 (Apr. 25, 2005).

* cited by examiner

*Primary Examiner* — Hung Lam
(74) *Attorney, Agent, or Firm* — Opticus IP Law PLLC

(57) ABSTRACT

A three-mirror anastigmatic with at least one non-rotationally symmetric mirror is disclosed. The at least one non-rotationally symmetric mirror may be an electroformed mirror shell having a non-rotationally symmetric reflective surface formed by a correspondingly shaped mandrel.

18 Claims, 39 Drawing Sheets

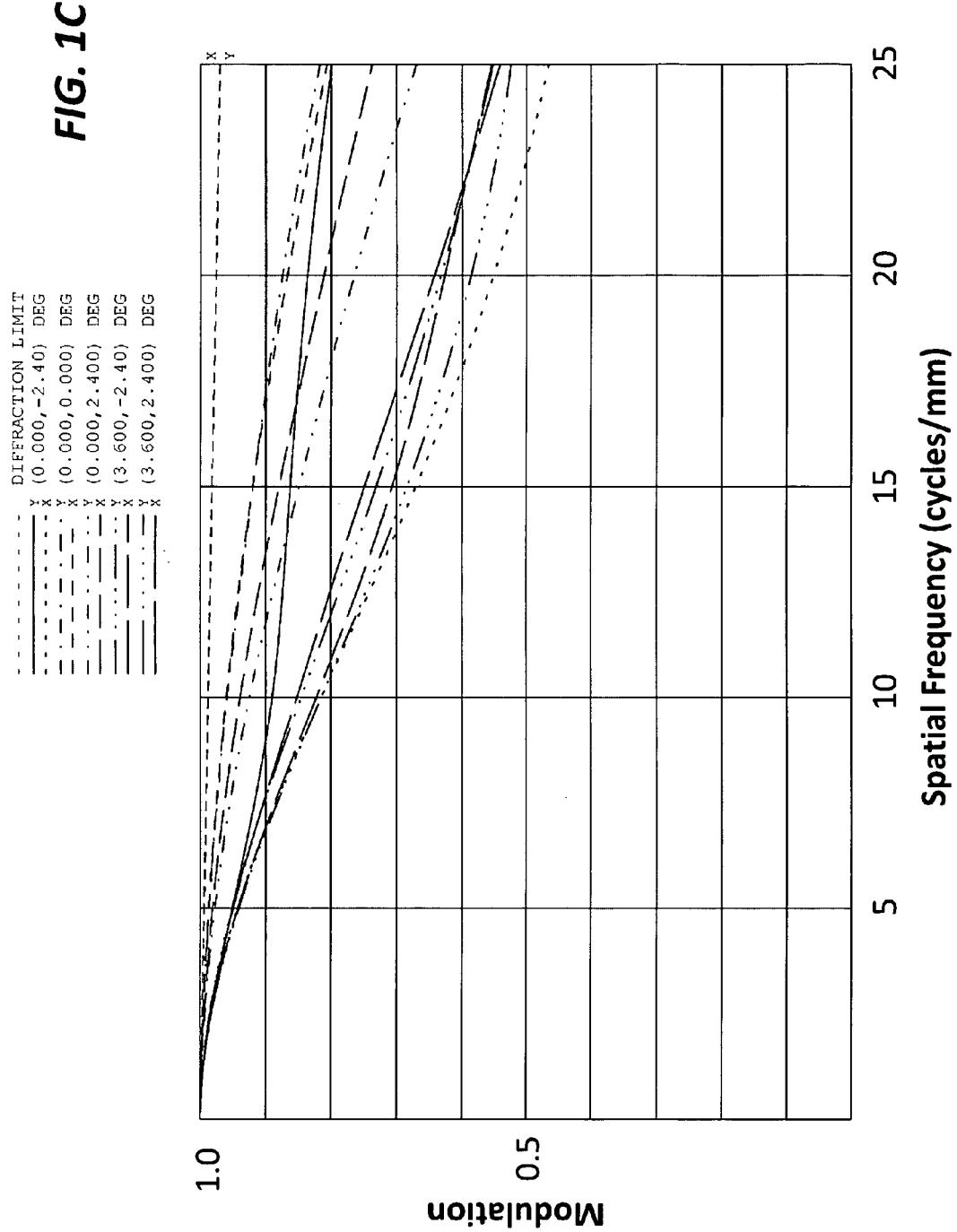

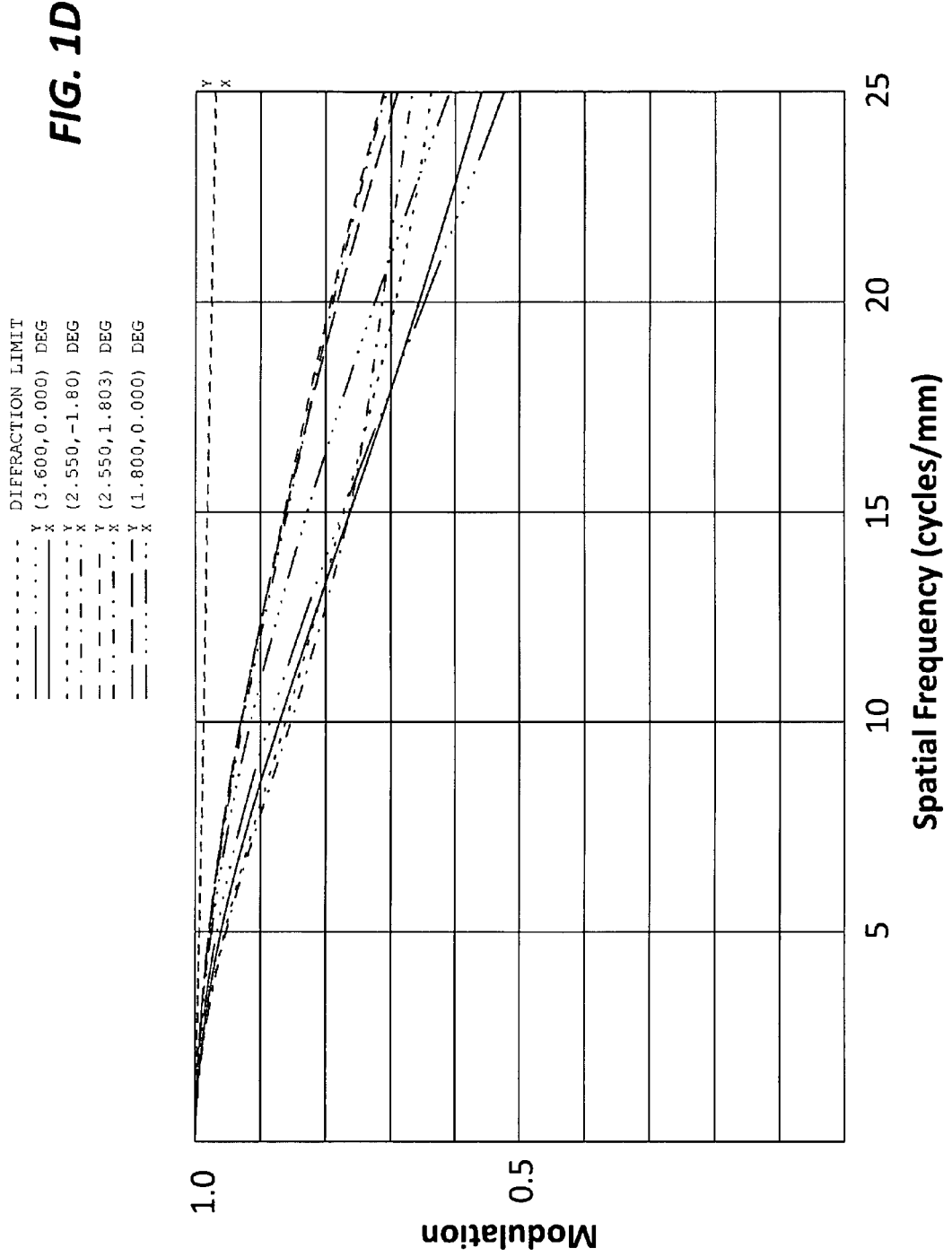

THREE-MIRROR ANASTIGMAT WITH AT LEAST ONE NON-ROTATIONALLY SYMMETRIC MIRROR

FIELD

The present disclosure relates to reflective optical systems, and in particular to three-mirror anastigmats having at least one non-rotationally symmetric mirror.

BACKGROUND ART

Optical imaging systems, and more specifically objective optical systems, provide information about a scene being viewed by collecting light (radiation) from an object space and delivering it to image space where a real image is formed and sensed by a detector. While many objective optical systems operate over a select range of wavelengths ("waveband"), imaging over multiple wavebands can provide additional information about the object space. The advent of high-performance electronic image sensors capable of sensing multiple wavebands of light enables such multi-waveband objective optical systems. However, this places additional demands on the objective optical system because it must be well-corrected over the multiple wavebands.

The design of refractive objective optical systems having multi-waveband imaging capability is inhibited by the limited availability of refractive materials able to sufficiently transmit light and enable aberration correction, particularly chromatic aberrations. Other difficulties include managing system thermal sensitivity, which causes image defocus and loss of aberration correction at elevated and depressed temperatures.

Reflective objective optical systems have the advantage that mirrors do not depend on the transmission of light, have no chromatic aberrations and tend to be less thermally sensitive. One type of reflective objective optical system employing three mirrors is referred to as a "three mirror anastigmat" or "TMA". The mirrors of a TMA are configured so that the light traverses the system in four directions, thereby providing an unobscured view of the imaged scene, i.e., there is no vignetting.

TMAs having rotationally symmetrical mirrors that are decentered and tilted with respect to one another in one plane have been designed. However, conventional TMAs have limited compactness, relatively slow f/number, and marginal aberration correction. In addition, to meet other design requirements, such as having no signature augmentation and/or low distortion, the aperture needs to be significantly relaxed to achieve high performance. Furthermore, when a TMA is required to operate at shorter wavelengths (e.g., the visible waveband), the aberration correction becomes more difficult to attain in a compact design. Additional mirrors can be employed, but at the expense of greater complexity and perhaps greater size and weight.

SUMMARY

Improved TMA systems are disclosed that provide high-performance imaging at one or more final image planes for single waveband or multiple waveband operation. To minimize the residual image aberrations, at least one mirror is non-rotationally symmetric. The TMA systems may be arranged to provide access for location of a cold stop, to provide access for location of a beamsplitter that allows for multiple image sensors at multiple image planes, to control signature augmentation, and to have distortion correction that by itself is excellent, or that is of a form that can be corrected by electronic post-processing of a captured digital image.

An aspect of the disclosure is a reflective objective optical system for forming an image at a first image plane of an object in an object space over at least one waveband. The system includes a first mirror, a second mirror and a third mirror. The mirrors are arranged in TMA configuration and have respective first, second and third reflective surfaces that reflect light from the object to the image in order from the first reflective surface to the second reflective surface to the third reflective surface. There is at least one intermediate image location between the first and third mirrors where at least one intermediate image is formed. At least one of the first, second and third reflective surfaces is non-rotationally symmetric. In one example, the at least one non-rotationally symmetric surface is provided by a corresponding at least one electroformed mirror.

Another aspect of the disclosure is an optical objective system that comprises first, second and third mirrors having respective first, second and third reflective surfaces. The mirrors are arranged in a TMA configuration, wherein at least two of the first, second and third mirrors have toroidal surfaces. In one example, all three mirrors have toroidal surfaces. Electroformed mirrors can be used to support the two or more toroidal surfaces.

Additional features and advantages of the disclosure are set forth in the detailed description below, and in part will be readily apparent to those skilled in the art from that description or recognized by practicing the disclosure as described herein, including the detailed description which follows, the claims, as well as the appended drawings.

BRIEF DESCRIPTION OF THE DRAWINGS

FIG. 1C and FIG. 1D are plots of the Modulation Transfer Function (MTF) that plots the modulation (i.e., contrast in %) over the field of view (FOV) vs. resolution (i.e., spatial frequency in cycles/mm) for the visible waveband for the TMA system of FIGS. 1A and 1B;

Figure 1A:
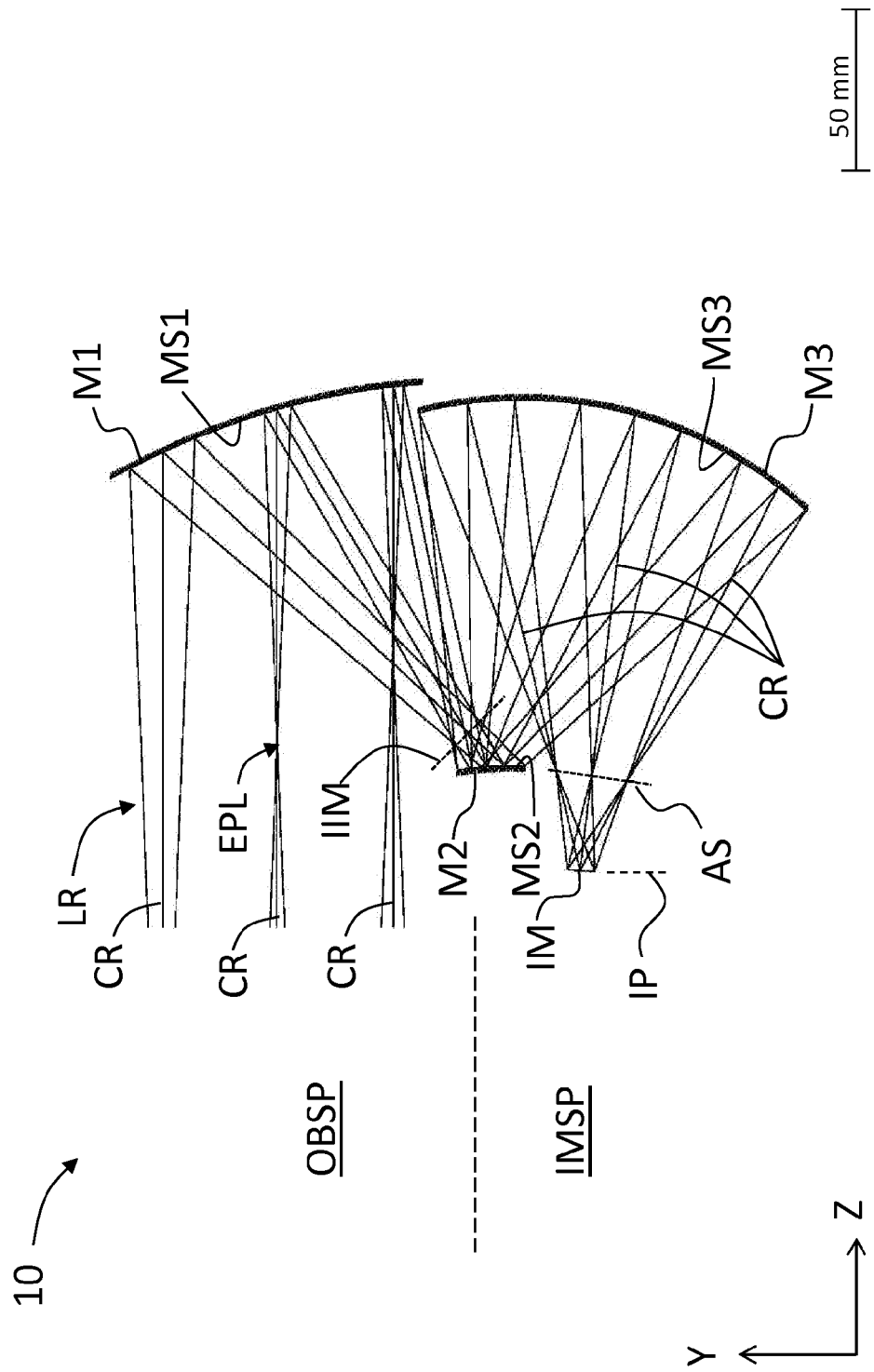
FIG. 1A and FIG. 1B are YZ and XZ schematic diagrams of a first example embodiment of a TMA system operating at a full aperture of approximately f/1.3.

The various elements depicted in the drawing are merely representational and are not necessarily drawn to scale. Certain sections thereof may be exaggerated, while others may be minimized. The drawing is intended to illustrate an example embodiment of the disclosure that can be understood and appropriately carried out by those of ordinary skill in the art. In the Figures, like components and elements are identified by like reference numbers and symbols.

DETAILED DESCRIPTION

The present disclosure relates to reflective optical systems, and in particular to TMAs having at least one non-rotationally symmetric mirror.

In an example, the at least one non-rotationally symmetric mirror is an electroformed mirror, i.e., the reflective surface is supported by an electroformed monolithic structure in the form of a rigid shell configured with the select non-rotationally symmetric surface shape. The electroformed mirror surface shape is formed by a correspondingly shaped mandrel and so can be reproduced inexpensively once the appropriate mandrel is fabricated. Example electroformed shells are made of nickel or nickel alloy, though any electroformable material may be used to form the electroformed mirror(s). The rotationally symmetric mirrors may be electroformed mirrors or may be conventional glass mirrors.

In another example, the at least one non-rotationally symmetric mirror can also be formed by conventional means, such as by diamond turning. The availability and cost of suitable diamond turning machines (e.g., a five-axis machine) may be a limiting factor in choosing to form a non-rotationally symmetric mirror by diamond turning. Further, weight and compactness requirements are not easy to achieve using conventional glass mirrors even if the suitable surface shapes can be fabricated.

Moreover, the conventional diamond-turning process does not rely on a "master" to fabricate the mirror surface, so that each turned mirror surface is unique at small scales and requires substantial post-processing to meet the surface figure requirements. Thus, it is believed that forming the at least one non-rotationally symmetric mirror using electroforming techniques will, in most instances, be the more cost-effective and efficient approach.

Example embodiments of the present disclosure are described by way of various design examples set forth in Tables 1, 2, 3 and 4 and the lens design prescription data contained therein and also hereinbelow, which is extracted from data produced by CODE V® optical design software commercially available from Optical Research Associates, Inc., Pasadena, Calif., U.S.A. The example embodiments set forth in the Tables below all have three non-rotationally symmetric mirrors.

All data presented hereinbelow is given at a temperature of 25° C. (77° F.) and standard atmospheric pressure (760 mm Hg).

The example embodiments set forth herein provide high contrast at the desired spatial frequencies at fast apertures for use with short-wavelength wavebands and over single or multiple wavebands that span a substantial wavelength range.

The various wavebands referred to herein can have the following approximate wavelength ranges: the X-ray waveband includes wavelengths less than 13.5 nm. The EUV waveband includes 13.5 nm. The UV waveband is from about 20 nm to about 400 nm. The visible waveband is from about 450 nm to about 650 nm; the near-infrared waveband is from about 700 nm to 1,200 nm; the medium-infrared waveband is from about 3,000 nm to about 5,000 nm; and the far-infrared waveband is from about 8,000 nm to about 10,000 nm. In an example, the ratio of the longest to shortest wavelengths over the entire waveband is approximately 27 to 1 (e.g., 26.7:1).

To reduce diffraction-dependent loss of contrast at the desired spatial frequencies and at the longer wavelengths of the waveband or wavebands, such as for the medium infrared or far infrared wavebands, a fast aperture is required, for example with an f/number less than about 4. The objective optical systems disclosed herein achieve this in a compact system by utilizing at least one non-rotationally symmetrical mirror, which may be located off axis, such as decentered or tilted with respect to the other mirrors.

The objective optical systems described herein can be considered improvements to conventional TMA systems, such as described in U.S. Pat. Nos. 4,265,510, 4,834,517 and 6,016,220, which patents are incorporated by reference herein.

The TMA systems disclosed herein can be made compact and with a fast aperture while also providing high contrast at the desired spatial frequencies over single and multiple wavebands while also providing other useful features, such as reduced weight. This is particularly true in the case where one or more electroformed mirrors are used.

Example embodiments of the TMAs described herein are configured so that the chief ray CR of the axial field beam AFB is either normally or not normally incident the image plane IP (and thus an image sensor IS arranged thereat) so that the image sensor surface is either not tilted or tilted with respect to the optical axis of the incoming light (see FIG. 1I, discussed below).

In the description below, the terms "downstream" and "upstream" refer to the direction of the incoming light LR, i.e., the incoming light "flows" from upstream to downstream. Thus, where a second optical element is downstream of a first optical element, the first optical element receives the light before the second optical element. Thus, the object space is upstream of the image space.

Embodiment 1

Figure 1B:
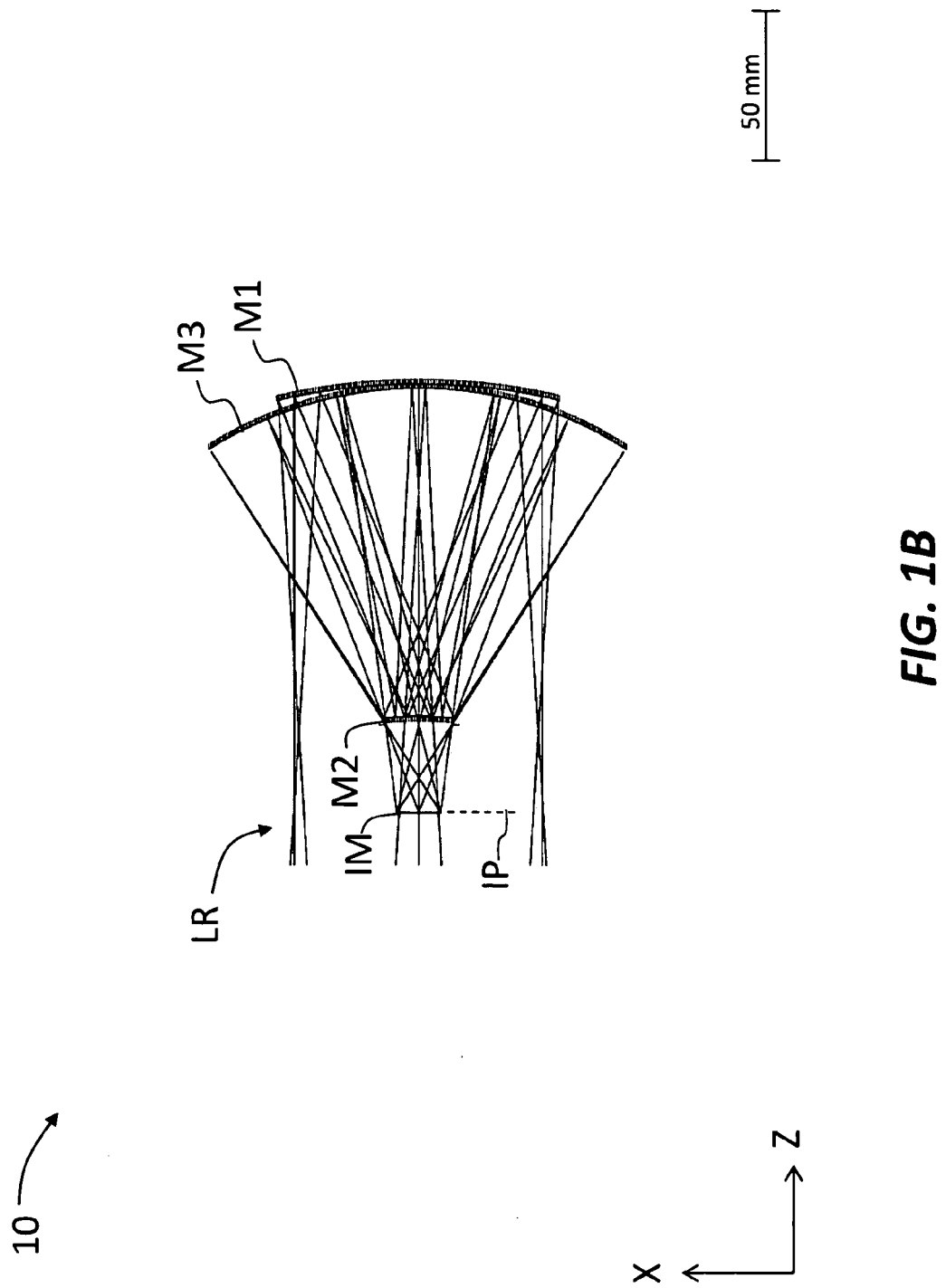

FIG. 1A and FIG. 1B are YZ and XZ schematic diagrams of a first example embodiment of a TMA system ("system") 10 operating at a full aperture of approximately f/1.3. TMA system 10 includes a first (primary) mirror M1 having a reflective surface MS1, a second (secondary) mirror M2 having a reflective surface MS2, and a third (tertiary) mirror M3 having a reflective surface MS3. Mirrors M1, M2 and M3 are arranged in a TMA configuration that is off-axis and decentered in the YZ plane.

Light rays LR are shown as initially traveling from left to right from an object space OBSP toward primary mirror M1. The initial light rays LR include central rays that are substantially parallel to one another in the object space OBSP. The initial light rays LR are therefore first incident upon primary mirror M1 with the central rays being substantially parallel. Primary mirror M1 reflects light rays LR to secondary mirror M2, which in turn reflects the light rays to tertiary mirror M3. Tertiary mirror M3 directs the light rays LR to an image plane IP in image space IMSP to form an image IM at the image plane, wherein the central rays CR of the light rays LR that reflect from tertiary mirror M3 are not substantially parallel. An aperture stop AS is located between the tertiary mirror M3 and image plane IP.

An entrance pupil is located at an entrance pupil location EPL where the axial rays cross in object space OBSP upstream of primary mirror M1, as shown. This is a paraxial location, however, and pupil aberrations (mainly distortion) cause the entrance pupil to not lie in a perfect plane located at entrance pupil location EPL. That said, the entrance pupil aberrations have no substantial impact on the imaging performance of TMA system 10.

An intermediate image IIM is formed between mirrors M1 and M2 (see FIG. 1A). Having an intermediate image IIM is advantageous because it can be used to block unwanted light that may or may not have originated at a source (not shown) in object space OBSP and that follows a spurious path to the image plane IP and thus to an image sensor IS located thereat. This spurious light may be blocked or partially blocked by the introduction of an aperture or baffles between or around the mirrors or by placing a field stop at intermediate image IIM. The effectiveness of the light baffles depends on the accessibility of intermediate image IIM. In some cases (e.g., embodiments 1 and 4), baffles that extend to the bottom portion of intermediate image IIM would obscure the optical path and so could only reside on the top portion of the intermediate image and thus only be partially effective. On the other hand, in some cases (e.g., embodiments 2 and 3), no such obscuration would occur, so that full baffles could be used.

In an example, an image sensor IS is arranged at image plane IP to detect image IM, as discussed in greater detail below (see, e.g., FIG. 1H). For imaging over one or more wavebands having relatively long wavelengths, for example the medium and far infrared wavebands, an advantage of the TMA systems described herein is that they can be configured to have no obscuration or vignetting of the light as it enters and passes through the system to the image sensor(s) IS. This is useful at longer wavelengths to increase the thermal sensitivity and hence the thermal resolution of the system.

To increase the sensitivity of an image sensor IS that detects light at longer wavelengths (for example, in the medium infrared waveband of 3 µm to 5 µm or the far infrared waveband of 8 µm to 12 µm, or both wavebands), the image sensor pixel size may be relatively large, e.g., about 25 µm. For an image sensor IS that detects light at shorter wavelengths (for example, in the visible waveband of 450 nm to 650 nm or in the near infrared waveband of 700 nm to 1,200 nm, or in both wavebands), the image sensor pixel size may be smaller, e.g., about 10 microns, without significantly affecting detection sensitivity.

Thus, for image IM having a size of about 15.2 mm horizontal by 10.1 mm vertical, in one example there may be about 600 pixels and 1,500 pixels across the longer and shorter waveband image sensors, respectively. A pixel size of 10 microns requires relatively high contrast (modulation) at a spatial frequency of about 25 cycles/mm, and a pixel size of 25 microns requires relatively high contrast at a more relaxed 10 cycles/mm.

In TMA system 10, at least one of primary mirror M1, secondary mirror M2 and tertiary mirror M3 is non-rotationally symmetric. In an example embodiment, the at least one non-rotationally symmetric mirror is formed by an electroforming process, such as described in U.S. Patent Application Publication No. 2009/0314646, which is incorporated herein by reference.

In the Tables set forth hereinbelow, SRF is shorthand for "surface," and AS is shorthand for "aperture stop." The notation "E-n" used below is shorthand for "$10^{-n}$".

Table 1 below sets forth an example lens design prescription for TMA system 10 according to this first embodiment.

TABLE 1

| | FIRST EMBODIMENT LENS DESIGN PRESCRIPTION | | | | | | | |
|---|---|---|---|---|---|---|---|---|
| ITEM | RY | RX | XP | YP | ZP | XR | YR | ZR |
| OBJ SRF | Flat | Flat | 0.0000 | 0.0000 | Infinity | 0.0000 | 0.0000 | 0.0000 |
| REF SRF | Flat | Flat | 0.0000 | 0.0000 | 0.0000 | 0.0000 | 0.0000 | 0.0000 |
| M1 | −201.6884 | −222.0775 | 0.0000 | −5.0000 | 120.0000 | −10.2729 | 0.0000 | 0.0000 |
| M2 | −146.1064 | −126.2781 | 0.0000 | −4.5873 | 0.1809 | −7.1325 | 0.0000 | 0.0000 |
| M3 | −140.5417 | −136.3313 | 0.0000 | −5.2435 | 116.8992 | −6.7674 | 0.0000 | 0.0000 |

TABLE 1-continued

FIRST EMBODIMENT LENS DESIGN PRESCRIPTION

| ITEM | RY | RX | XP | YP | ZP | XR | YR | ZR |
|---|---|---|---|---|---|---|---|---|
| AS | Flat | Flat | 0.0000 | −11.4264 | −1.8208 | −7.0527 | 0.0000 | 0.0000 |
| IM SRF | Flat | Flat | 0.0000 | −7.6962 | −31.9899 | −3.0944 | 0.0000 | 0.0000 |

The surface profiles for non-rotationally symmetric mirrors M1, M2 and M3 are governed by the following conventional equation:

$$Z = \alpha/\beta + \gamma + \delta, \text{ where}$$

$$\alpha = (CX)X^2 + (CY)Y^2$$

$$\beta = 1 + (1 - (1+KX)(CX)^2 X^2 - (1+KY)(CY)^2 Y^2)^{1/2}$$

$$\gamma = AR((1-AP)X^2 + (1+AP)Y^2)^3 + BR((1-BP)X^2 + (1+BP)Y^2)^3$$

$$\delta = CR((1-CP)X^2 + (1+CP)Y^2)^4 + DR((1-DP)X^2 + (1+DP)Y^2)^5$$

where RX and RY are the radii of curvatures of the given surface about the X and Y axes, respectively, and where $CX = 1/RX$, $CY = 1/RY$, and KX, KY, AR, AP, BR, BP, CR, CP, DR and DP are the polynomial coefficients. Also, Z is the position of the surface profile for a given X and Y value as measured along the optical axis from the pole (i.e., axial vertex) of the surface. The surface location is given with respect to a reference surface where XP, YP and ZP are position distances in the X, Y and Z directions respectively, and XR, YR and ZR are rotational angles about the X, Y and Z axes, respectively.

The coefficients for mirror M1 are:

| | | | |
|---|---|---|---|
| CY = −0.00495814 | KY = −0.674485 | CX = −0.00450293 | KX = −0.636631 |
| AR = −5.45874E−11 | BR = −7.94786E−17 | CR = −5.84955E−23 | DR = 1.25914E−21 |
| AP = 8.27399E−02 | BP = −4.71383E+00 | CP = −7.91052E+00 | DP = −1.11559E+00 |

The coefficients for mirror M2 are:

| | | | |
|---|---|---|---|
| CY = −0.00684433 | KY = 0.000000 | CX = −0.00791903 | KX = 0.000000 |
| AR = 9.49190E−08 | BR = −3.92032E−10 | CR = 9.25871E−13 | DR = 1.90290E−16 |
| AP = 0.0000E+00 | BP = −2.88837E−01 | CP = −1.20843E+00 | DP = −4.69767E−01 |

The coefficients for mirror M3 are:

| | | | |
|---|---|---|---|
| CY = −0.00711533 | KY = −0.014222 | CX = −0.00733507 | KX = −0.035238 |
| AR = 2.25156E−13 | BR = −7.16155E−14 | CR = 7.62816E−28 | DR = 0.00000E+00 |
| AP = 1.10431E+01 | BP = 2.28262E−01 | CP = 2.44883E+02 | DP = 0.00000E+00 |

The example non-rotationally symmetric surface shape of mirrors M1 through M3 can be referred to as a "toroidal asphere" or an "anamorphic asphere." In example embodiments, the at least one non-rotationally symmetric surface is described by a general polynomial having one or more cross-terms that account for the non-rotationally symmetric nature of the surface.

The fields of view (FOVs) at the object surface in the object space are 7.6° horizontal in the X axis and 4.8° vertical in Y axis. The full aperture is approximately f/1.3, and the effective focal length is approximately 98 mm.

Figure 1E:
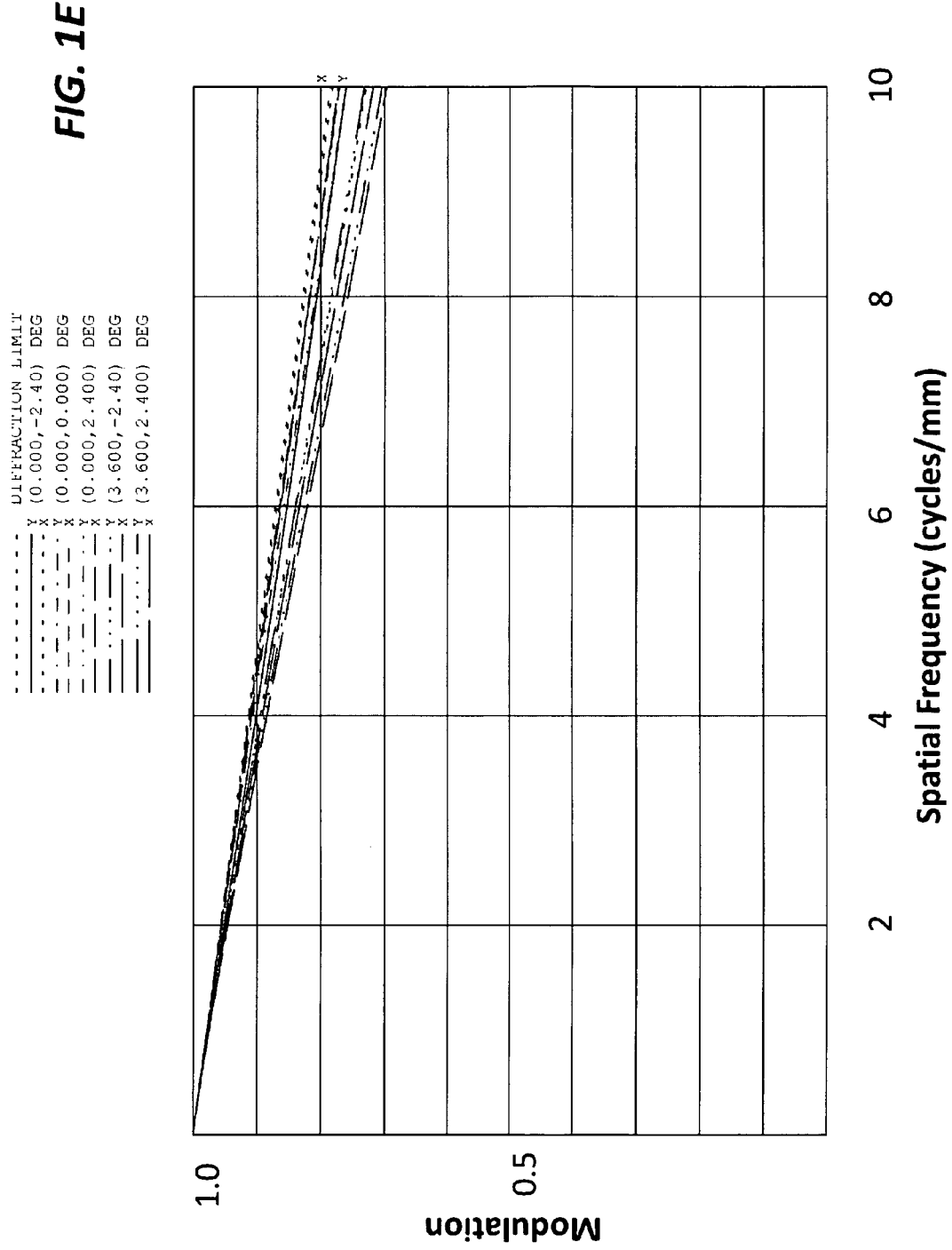
FIG. 1E and FIG. 1F are plots of the MTF over the field of view for the far infrared waveband for the TMA system of FIGS. 1A and 1B.
Figure 1F:
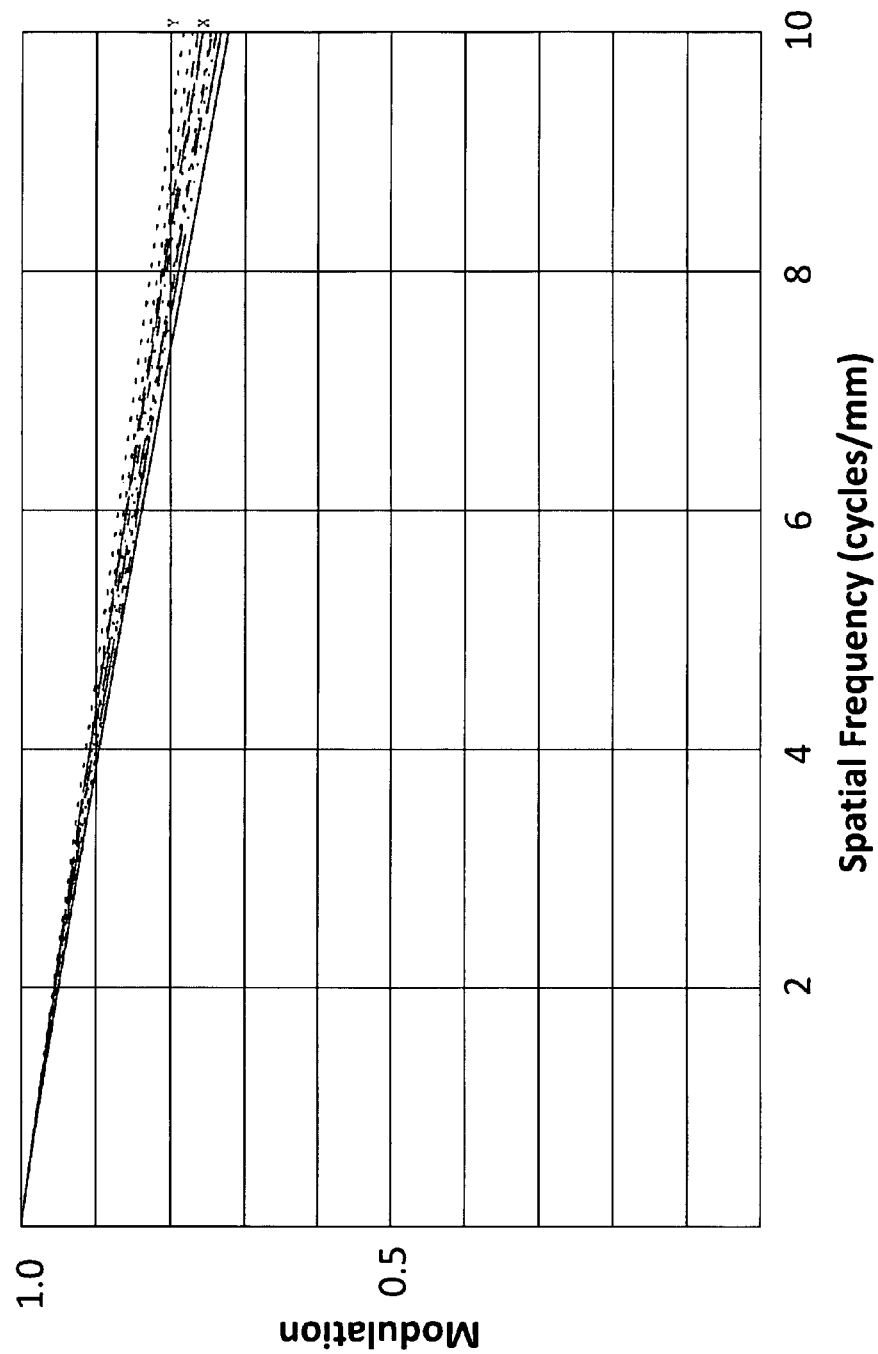

FIG. 1C and FIG. 1D are plots of the Modulation Transfer Function (MTF), which plots the modulation (i.e., the contrast in %) over the FOV vs. resolution (i.e., the spatial frequency in cycles/mm) for the visible waveband for the TMA system of FIGS. 1A and 1B. FIG. 1E and FIG. 1F are plots of the MTF over the field of view for the far infrared waveband for the TMA system of FIGS. 1A and 1B.

As noted above, an image-sensor pixel size of 10 microns requires relatively high contrast (modulation) at a spatial frequency of about 25 cycles/mm, and an image-sensor pixel size of 25 microns requires relatively high contrast at 10 cycles/mm. Note that the MTF plots of FIGS. 1C and 1D have excellent modulation (~50% or greater) at spatial frequencies up to 25 cycles/mm and FIGS. 1E and 1F show excellent modulation (~70% or greater) up to 10 cycles/mm.

TMA system 10 may be configured to reduce optical distortion, or at least have distortion that has a form (signature) that is amenable to correction by electronic post-processing. Even though optical distortion may be corrected electronically by altering the output signal of the image sensor after detection of the light by the image sensor, the reduction of optical distortion may still provide a benefit of simplifying the overall system complexity, including reducing weight.

Figure 1G:
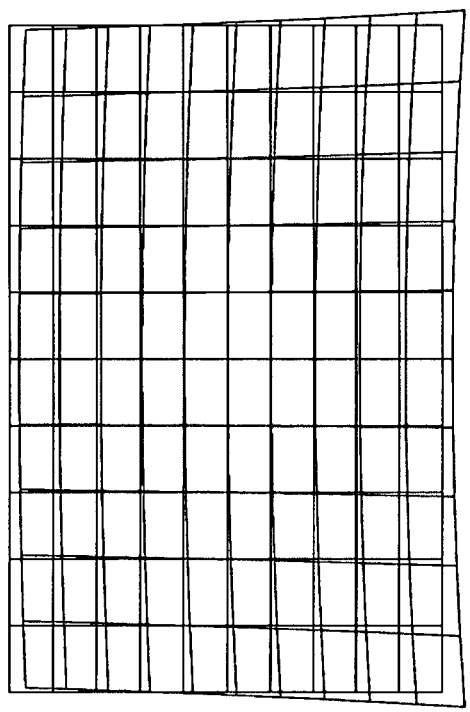
FIG. 1G plots the distortion over the horizontal and vertical FOVs for the TMA system of FIGS. 1A and 1B.

FIG. 1G plots the distortion over the horizontal and vertical FOVs for the objective optical system of FIGS. 1A and 1B, and illustrates moderately good distortion correction over both FOVs, with simple shape characteristics that allow the distortion to be readily corrected by electronic post-processing.

A further advantage of the TMA systems described herein is that a cold stop can be readily inserted at the aperture stop location without vignetting. A cold stop reduces spurious light reaching the sensor. This can serve to increase the system's thermal sensitivity hence thermal resolution at longer wavelengths, such as in the medium and far infrared wavebands.

Figure 1H:
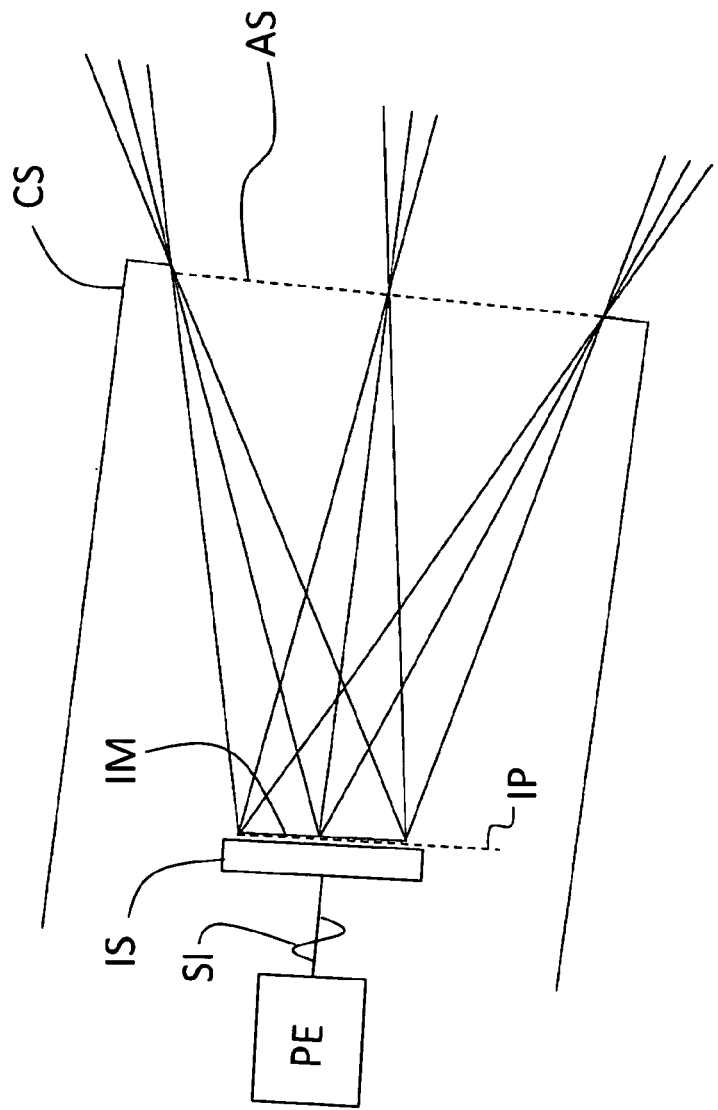
FIG. 1H is a close-up view of a portion of the TMA system of FIGS. 1A and 1B, showing a cold stop positioned at the aperture stop.

FIG. 1H is a close-up view of a portion of the TMA system of FIGS. 1A and 1B, showing a cold stop CS positioned at aperture stop AS. Also shown in FIG. 1H is an image sensor IS arranged at image plane IP. In an example, image sensor IS is a multiband electronic image sensor that can detect radiation (light) over multiple wavebands. In an example embodiment, TMA system 10 include processing electronics PE electrically connected to image sensor IS and configured to process information from image sensor IS as embodied in an electronic signal SI sent from the image sensor in response to detecting light at image plane IP.

In an example embodiment, processing electronics PE is configured to perform image processing of the captured image IM. For example, processing electronics PE can be configured to correct image distortion. Thus, in example embodiment, the magnitude of the distortion need not be corrected to a high degree (e.g., to within about 10%), so long as the shape of the distortion is sufficiently simple to allow for electronic distortion correction.

Where multiple image sensors IS are employed in TMA system 10, the multiple image sensors may be electrically connected to one or more processing electronics PE. A single processing electronics PE and a single image sensor SI are shown in FIG. 1H by way of illustration.

TMA system 10 can include a beamsplitter that enables separating image-forming light and directing the light to at least two different image sensors. Since a given image sensor IS may be capable of simultaneously detecting only one or two wavebands, a beamsplitter allows for two image sensors to be employed that detect light having different wavebands. For example, for detecting light from the visible through far infrared wavebands, medium and far infrared light may be detected by a first sensor IS1 and the visible and near infrared waveband may be detected by a second image sensor IS2 (see FIG. 1I, discussed below).

Figure 1I:
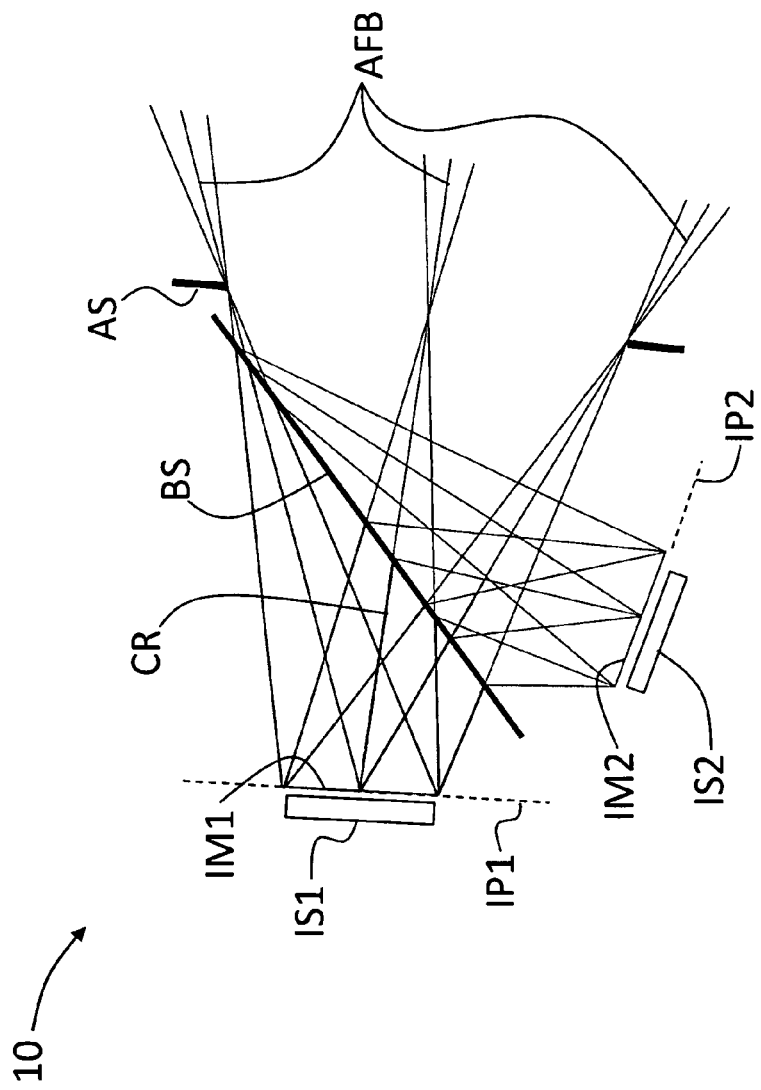
FIG. 1I is a close-up view of a portion of the TMA system of FIGS. 1A and 1B, showing a beamsplitter positioned downstream of the aperture stop and forming first and second image planes with first and second image sensors respectively arranged thereat.
Figure 1J:
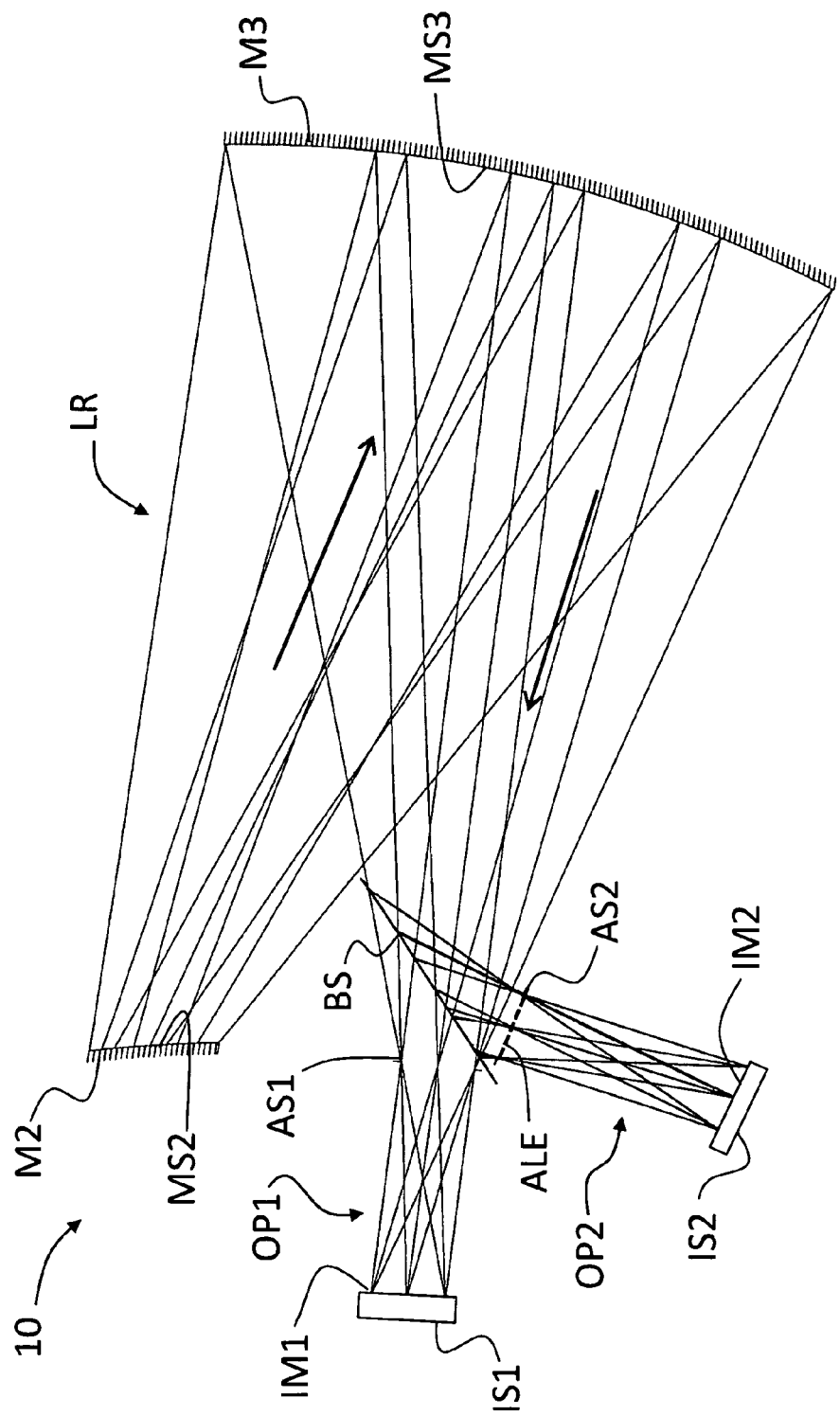
FIG. 1J is a close-up view of a portion of the TMA system of FIGS. 1A and 1B, showing a beamsplitter positioned between the aperture stop and the adjacent mirror, with the system operating at an aperture of f/3.4.

In addition to increasing the detection capability, a beamsplitter BS located between aperture stop AS and the adjacent mirror permits cold stop CS to be placed in the long waveband channel and a diaphragm or iris to be placed in the shorter waveband channel (see FIG. 1J). The diaphragm or iris may be variable in aperture to control the f/number, and hence intensity at the sensor, thus optimizing image quality.

FIG. 1I is a close-up view of the TMA system of FIG. 1A configured with beamsplitter BS that results in the formation of two image planes IP1 and IP2 at which are formed respective images IM1 and IM2 and at which are disposed respective image sensors IS1 and IS2. In an example embodiment, beamsplitter BS is wavelength selective so that different wavelengths (wavebands) are respectively transmitted and reflected to image sensors IS1 and IS2. In this example, image sensors IS1 and 1S2 may be configured to be sensitive to the particular waveband incident thereon. One or more wavelength-selective filters (not shown) may also be disposed in the optical path used to improve the wavelength selectivity. Also shown in FIG. 1I is an axial field beam AFB with a chief ray CR.

FIG. 1j is a close-up view of a portion of TMA system 10 of FIGS. 1A and 1B, showing a beamsplitter BS positioned between aperture stop AS and mirror M3, with the system operating at an aperture of f/3.4. This configuration leads to the formation of two optical paths OP1 and OP2 with corresponding image planes IP1 and IP2 and aperture stops AS1 and AS2. Two image sensors IS1 and 152 are shown disposed at respective image planes IP1 and IP2 to electronically capture respective images IM1 and IM2. In an example embodiment, beamsplitter BS is wavelength selective so that different wavelengths (wavebands) are respectively transmitted and reflected to image sensors IS1 and 1S2. An aperture-limiting element ALE, such as an iris or diaphragm, is shown located at aperture stop location AS2.

Figure 2A:
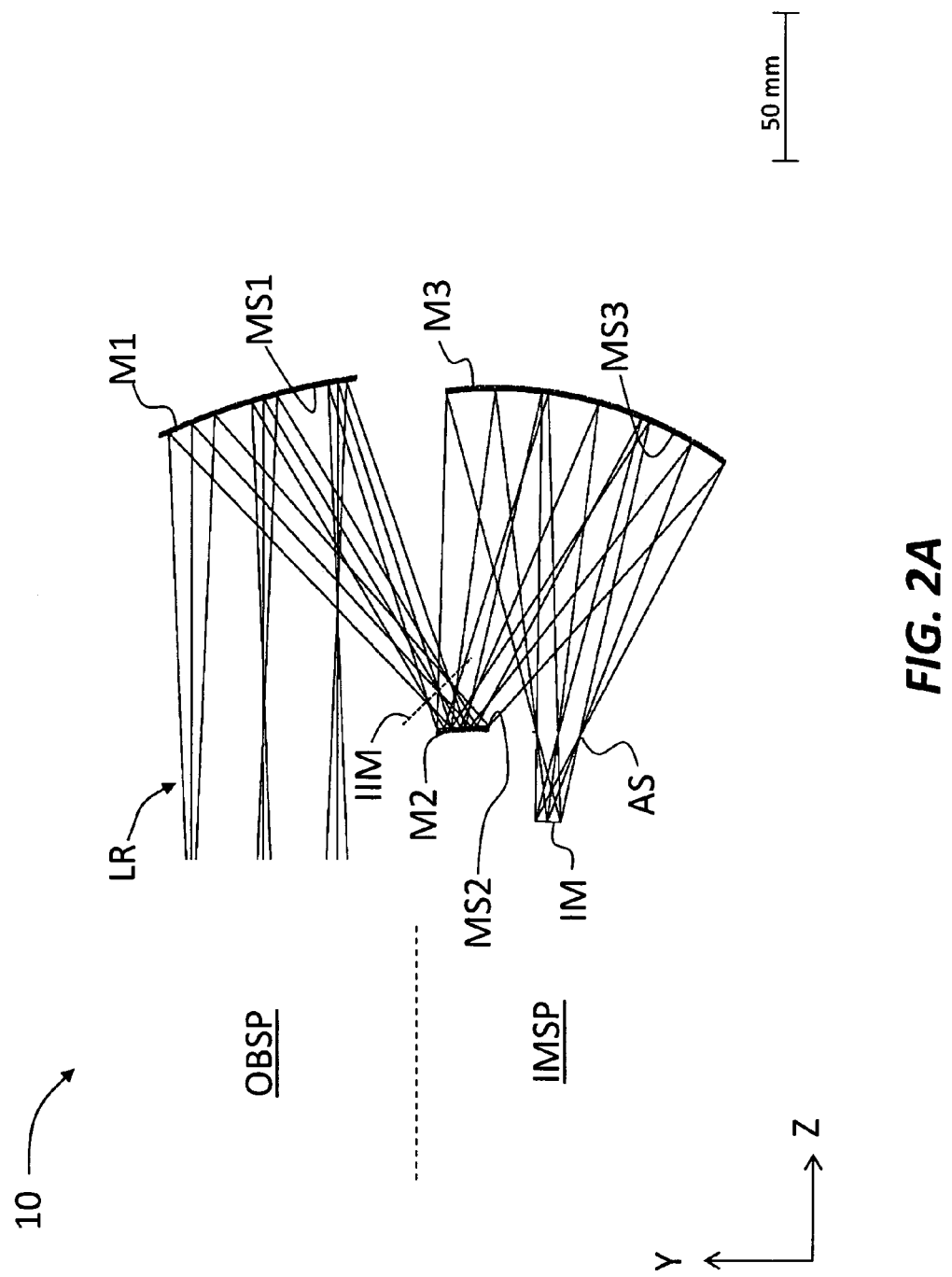
FIG. 2A and FIG. 2B are YZ and XZ schematic diagrams of the example TMA system of FIG. 1A and FIG. 1B, but operating at a full aperture of approximately f/2.
Figure 2B:
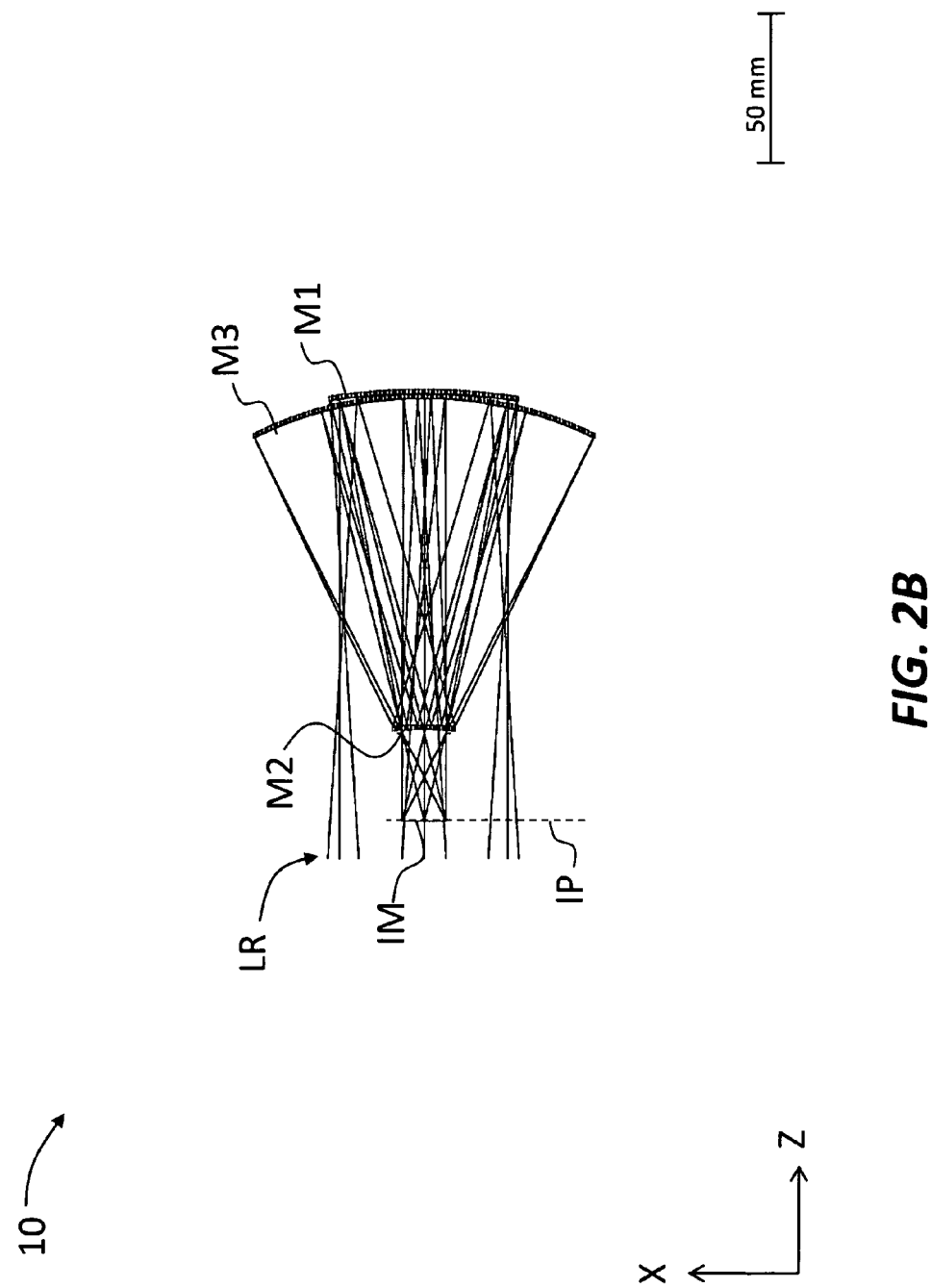
Figure 2C:
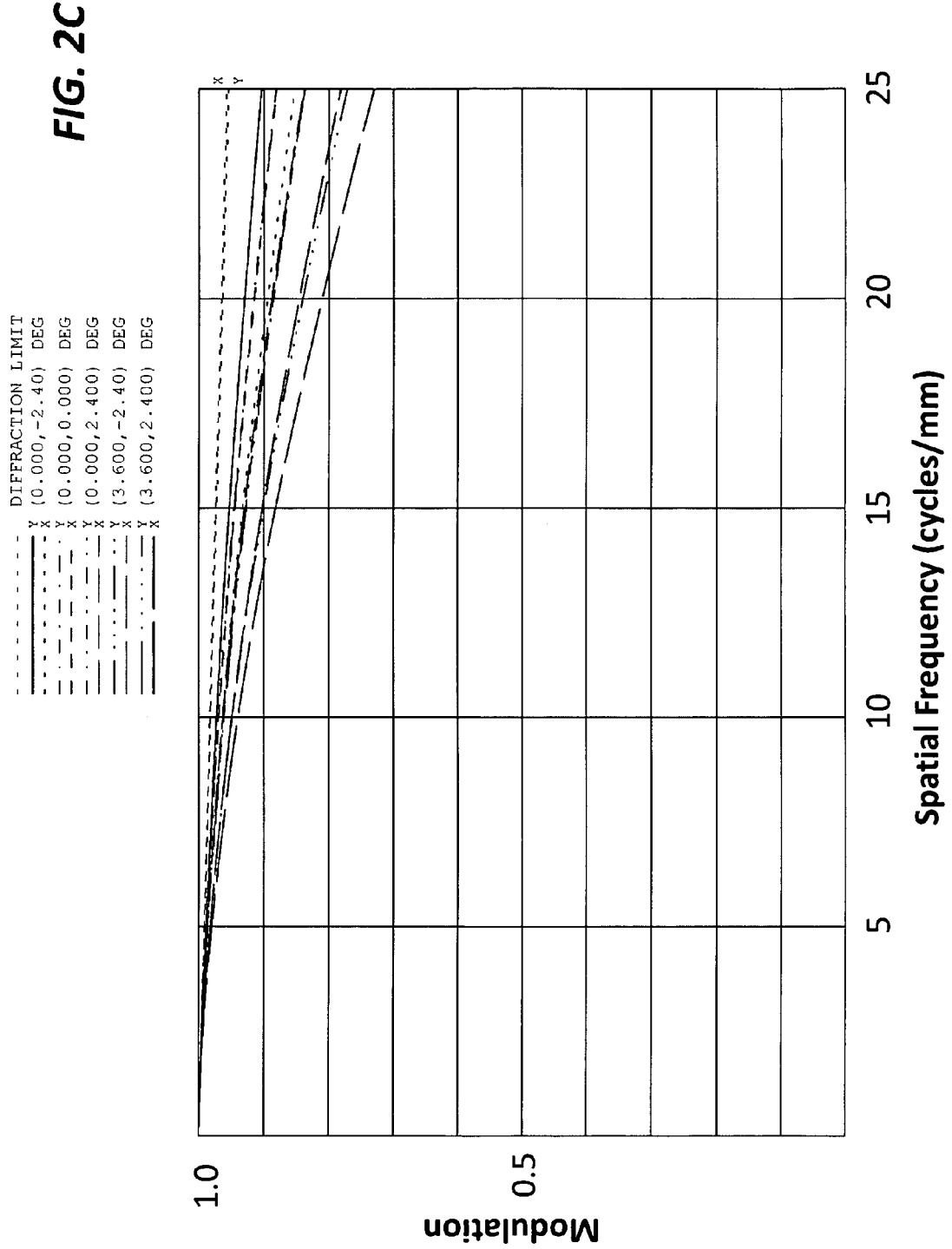
FIG. 2C and FIG. 2D are MTF plots over the field of view for the visible waveband for the TMA system of FIGS. 2A and 2B.
Figure 2D:
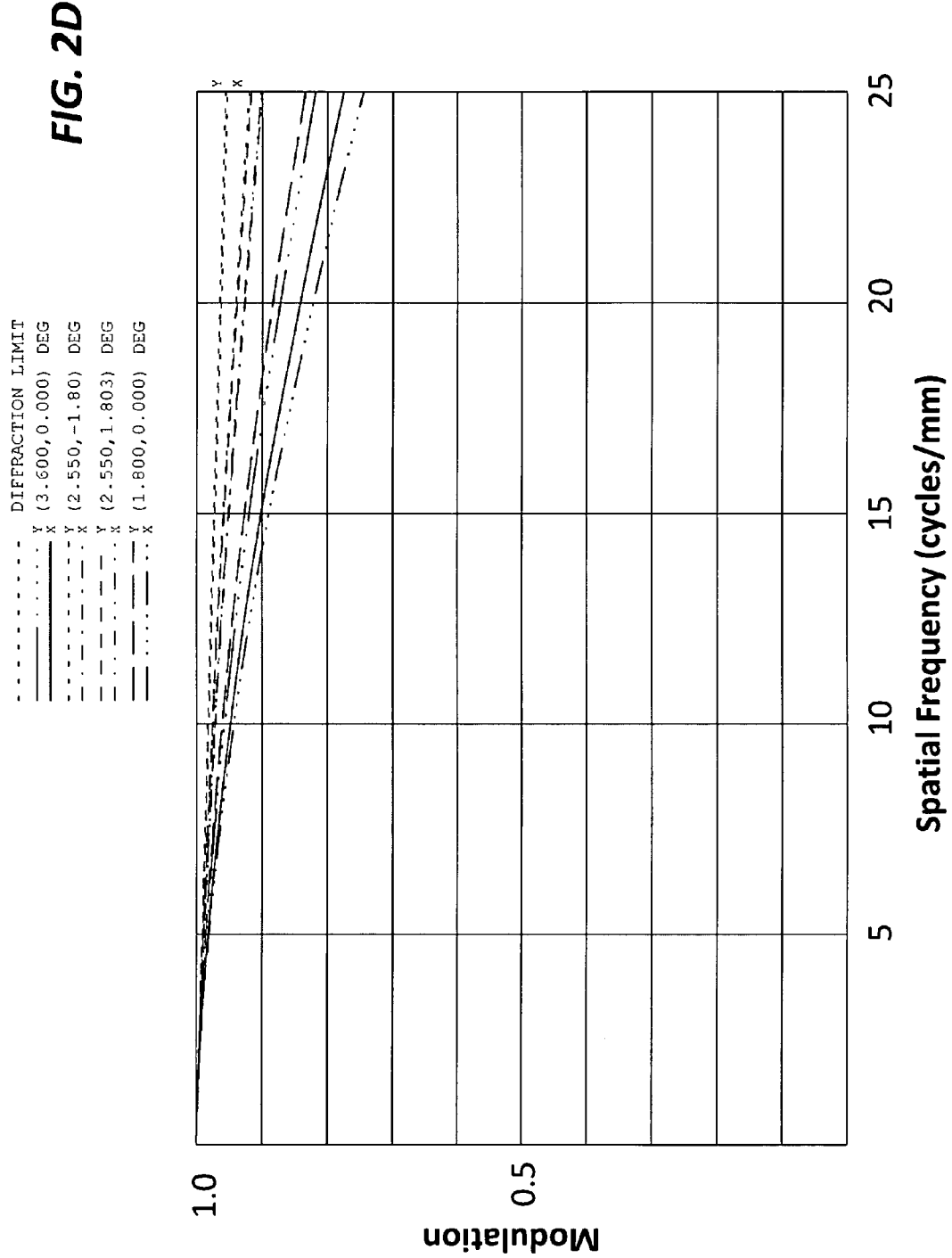
Figure 2E:
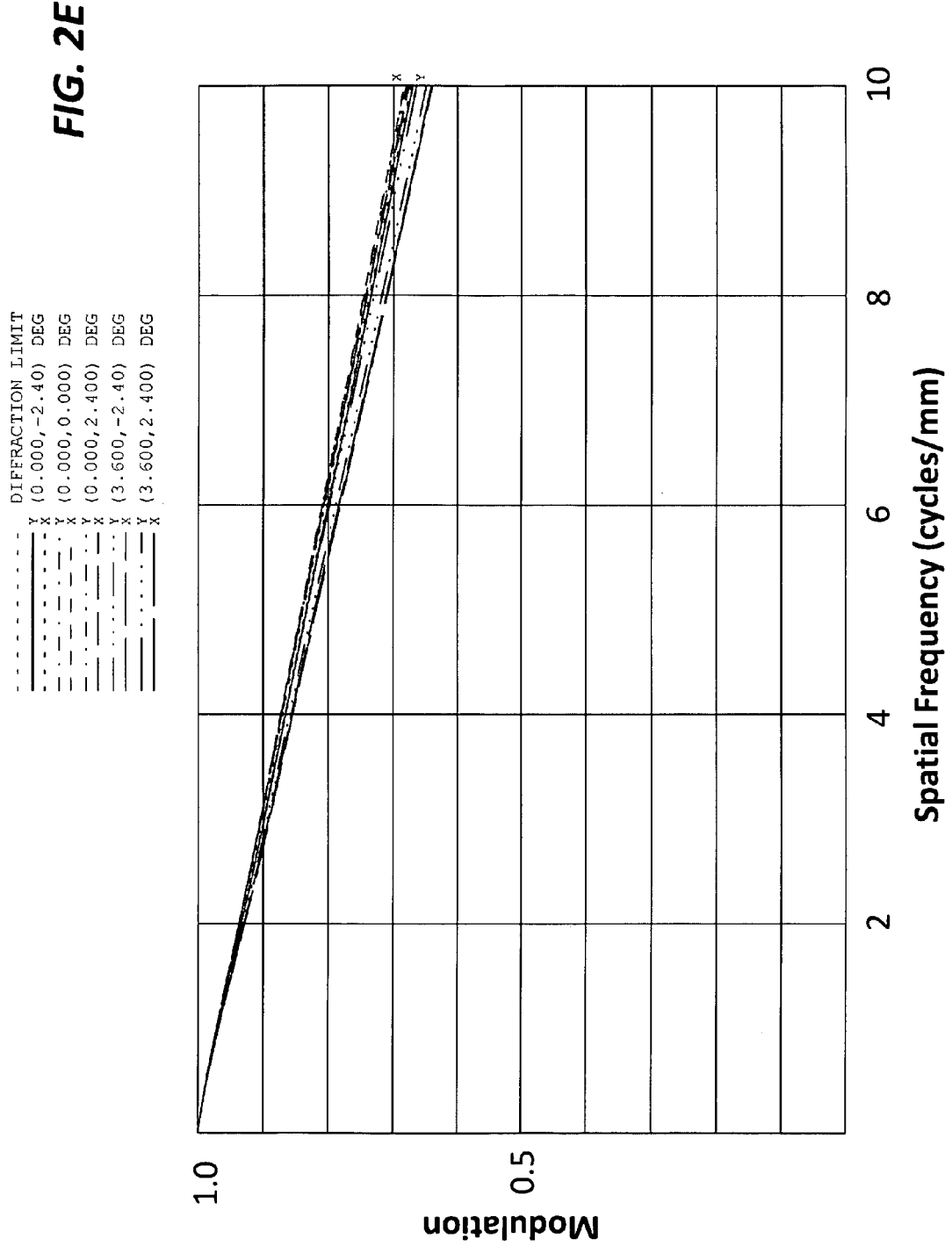
FIG. 2E and FIG. 2F are MTF plots over the field of view for the far infrared waveband for the TMA system of FIGS. 2A and 2B.
Figure 2F:
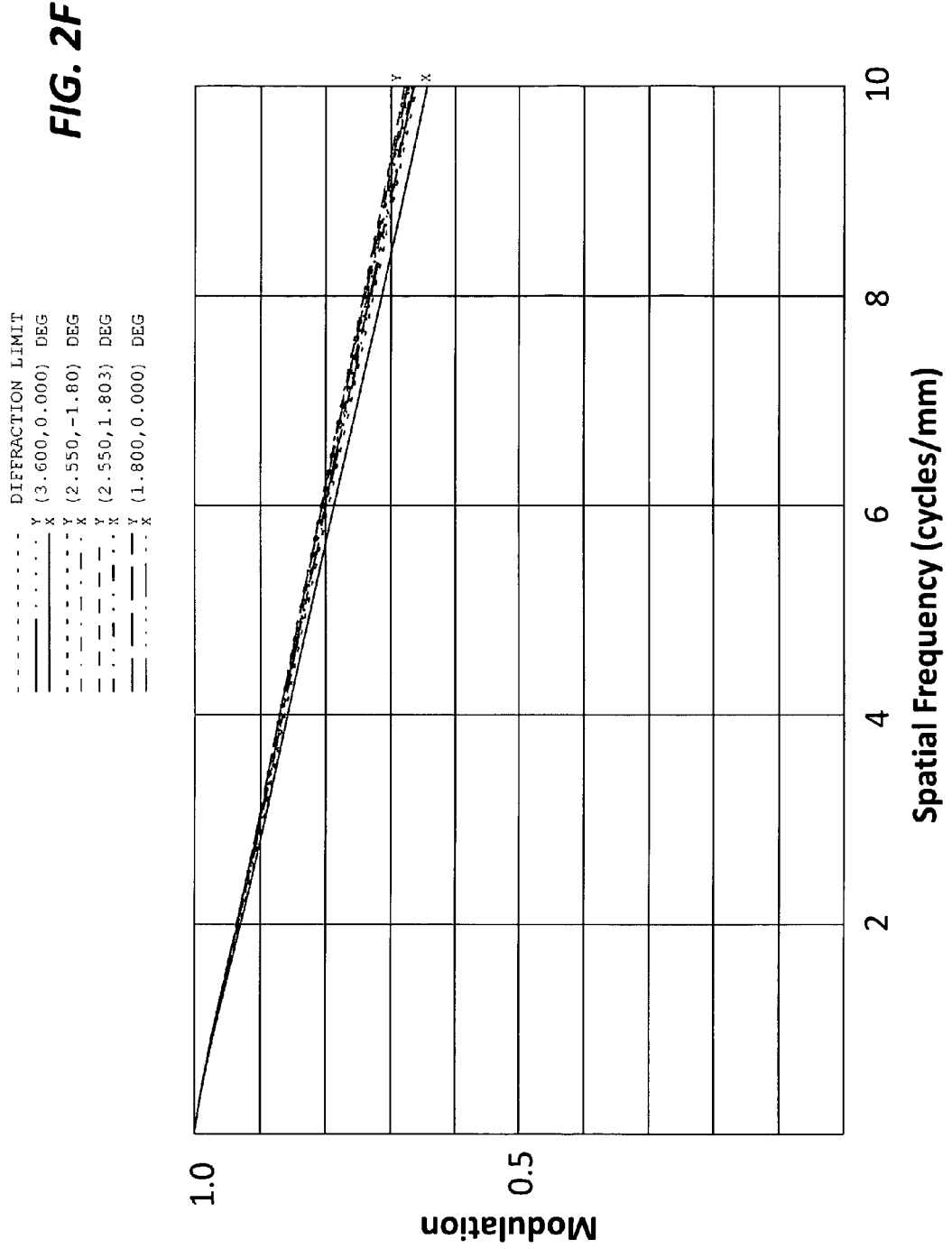

FIG. 2A and FIG. 2B are YZ and XZ schematic diagrams of the example TMA system 10 of FIG. 1A and FIG. 1B, but shown as operating at a full aperture of approximately f/2;

FIG. 2C and FIG. 2D are MTF plots over the field of view for the visible waveband for TMA system 10 of FIGS. 2A and 2B, while FIG. 2E and FIG. 2F are MTF plots over the field of view for the far infrared waveband for the TMA system of FIGS. 2A and 2B. The MTF plots of FIGS. 2C and 2D show a contrast of greater than 70% up to 25 cycles/mm, while the MTF plots of FIGS. 2E and 2F show a contrast of greater than 60% up to 10 cycles/mm.

Embodiment 2

Figure 3A:
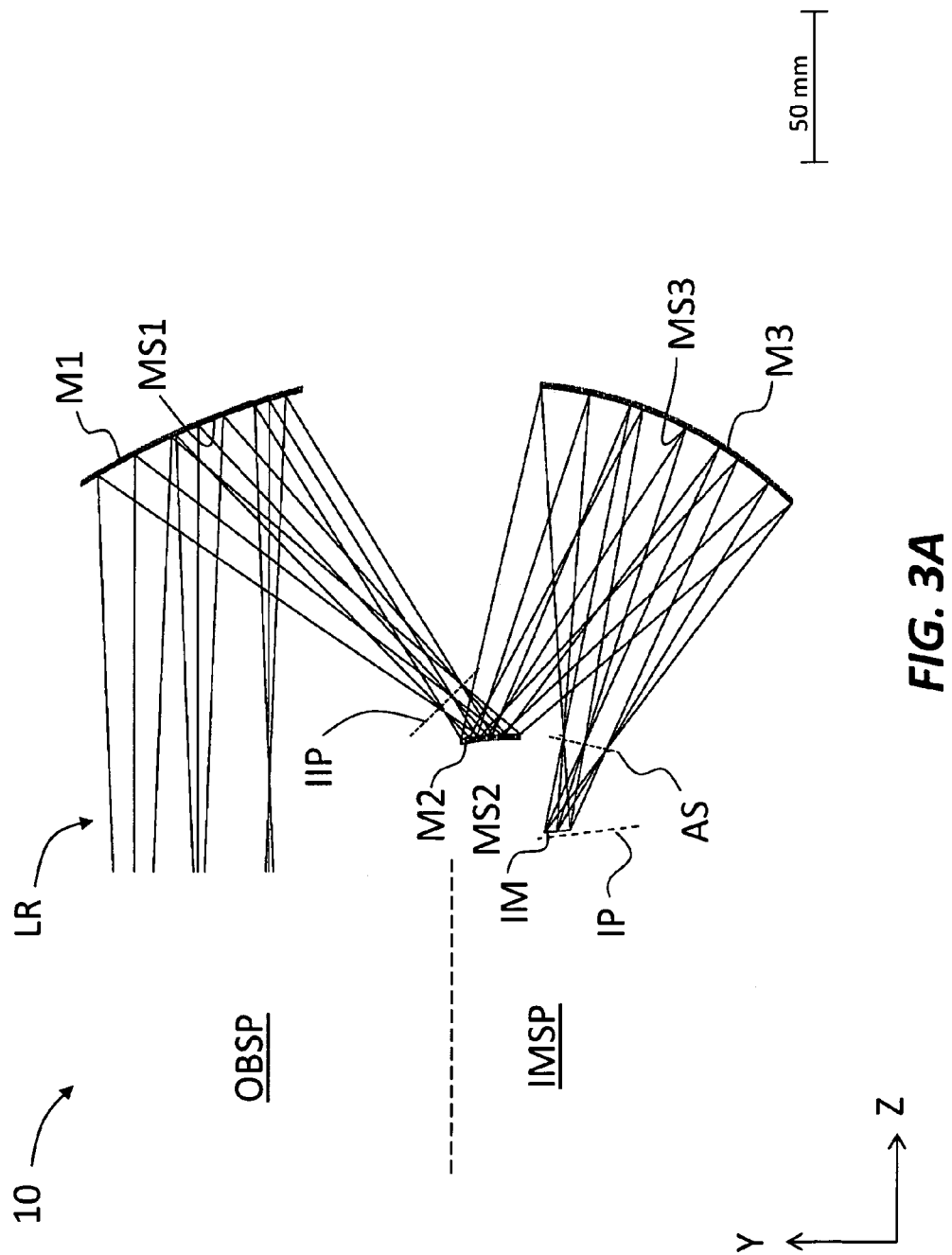
FIG. 3A and FIG. 3B are YZ and XZ schematic diagrams of a second example embodiment of a TMA system operating at a full aperture of approximately f/2 and having no signature augmentation.
Figure 3B:
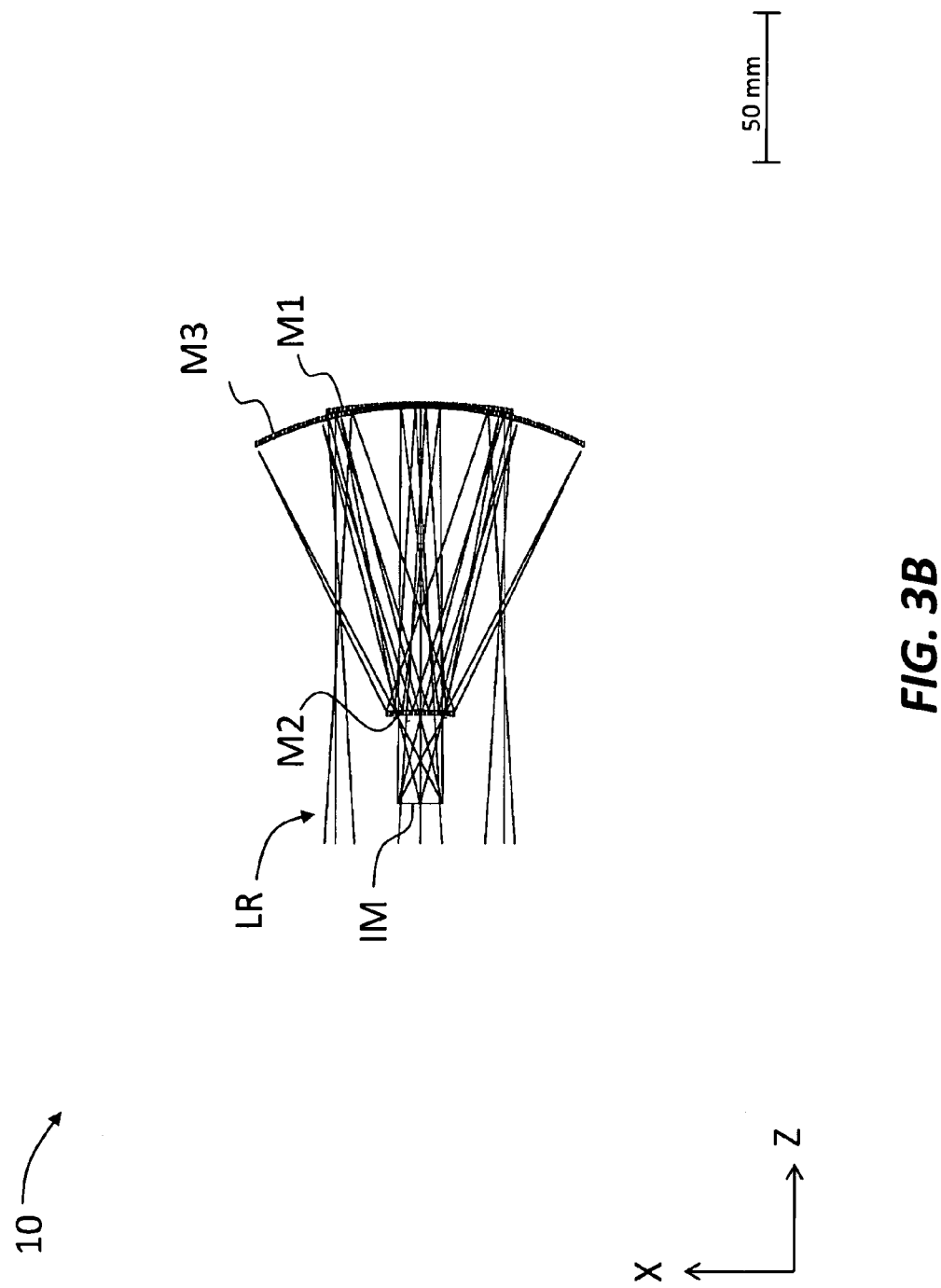

FIG. 3A and FIG. 3B are YZ and XZ schematic diagrams of a second example embodiment of TMA system 10 similar to that of FIGS. 1A and 1B, and operating at a full aperture of approximately f/2 and having no signature augmentation.

TABLE 2

SECOND EMBODIMENT LENS DESIGN PRESCRIPTION

| ITEM | RY | RX | XP | YP | ZP | XR | YR | ZR |
| --- | --- | --- | --- | --- | --- | --- | --- | --- |
| OBJ SRF | Flat | Flat | 0.0000 | 0.0000 | Infinity | 0.0000 | 0.0000 | 0.0000 |
| REF SRF | Flat | Flat | 0.0000 | 0.0000 | 0.0000 | 0.0000 | 0.0000 | 0.0000 |
| M1 | −205.1044 | −222.8025 | 0.0000 | −5.0000 | 120.0000 | −8.5765 | 0.0000 | 0.0000 |
| M2 | −113.0176 | −130.1015 | 0.0000 | −8.4166 | 0.8700 | −5.1996 | 0.0000 | 0.0000 |
| M3 | −140.2746 | −136.5995 | 0.0000 | −6.0545 | 117.3128 | −5.0226 | 0.0000 | 0.0000 |
| AS | Flat | Flat | 0.0000 | −20.2894 | −1.8286 | −18.1778 | 0.0000 | 0.0000 |
| IM SRF | Flat | Flat | 0.0000 | −10.6175 | −31.3167 | 4.7385 | 0.0000 | 0.0000 |

The coefficients for mirror M1 are:

$CY = -0.00487556$    $KY = -0.686247$    $CX = -0.00448828$    $KX = -0.654082$ $AR = -1.90716E-10$    $BR = -6.75685E-18$    $CR = 1.08161E-23$    $DR = 1.16122E-20$ $AP = 4.30883E-01$    $BP = -2.90298E+00$    $CP = -9.15213E+00$    $DP = -1.02112E+00$

The coefficients for mirror M2 are:

| | | | |
|---|---|---|---|
| CY = −0.00884818 | KY = 0.000000 | CX = −0.00768631 | KX = 0.000000 |
| AR = 4.43614E−07 | BR = −5.31215E−10 | CR = 6.67267E−14 | DR = 4.02670E−16 |
| AP = 0.00000E+00 | BP = −2.17908E−01 | CP = −1.43119E+00 | DP = −4.47257E−01 |

The coefficients for mirror M3 are:

| | | | |
|---|---|---|---|
| CY = −0.00712887 | KY = 0.009322 | CX = −0.00732067 | KX = −0.027355 |
| AR = 1.33879E−09 | BR = −4.52802E−14 | CR = 2.40938E−28 | DR = 0.00000E+00 |
| AP = 1.61201E−01 | BP = 1.84636E−01 | CP = 2.45172E+02 | DP = 0.00000E+00 |

The FOVs at the object surface in the object space are 7.6° horizontal in the X axis and 4.8° vertical in Y axis. The full aperture is approximately f/2, and the effective focal length is approximately 93 mm.

Figure 3C:
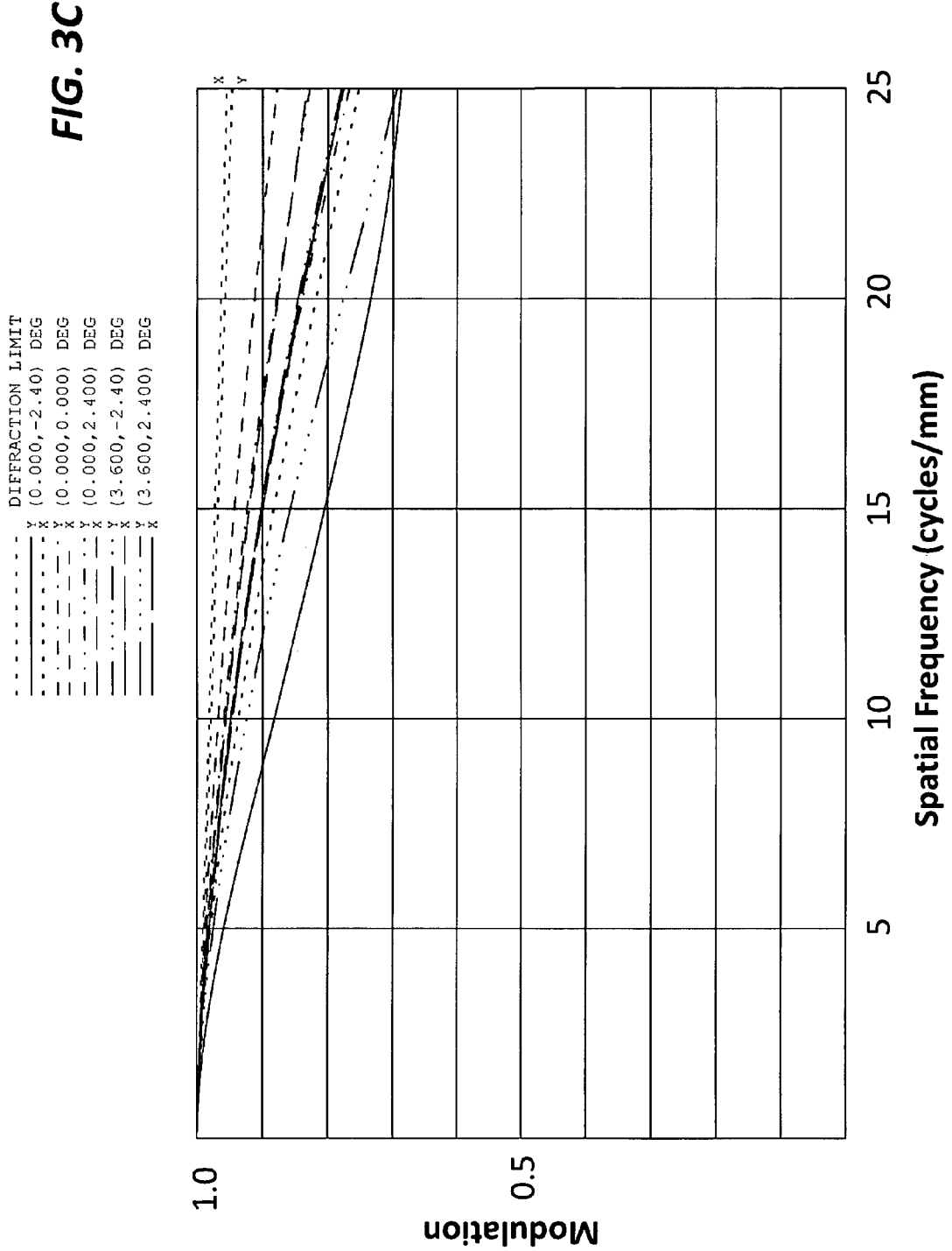
FIG. 3C and FIG. 3D are MTF plots over the field of view for the visible waveband for the TMA system of FIGS. 3A and 3B.
Figure 3D:
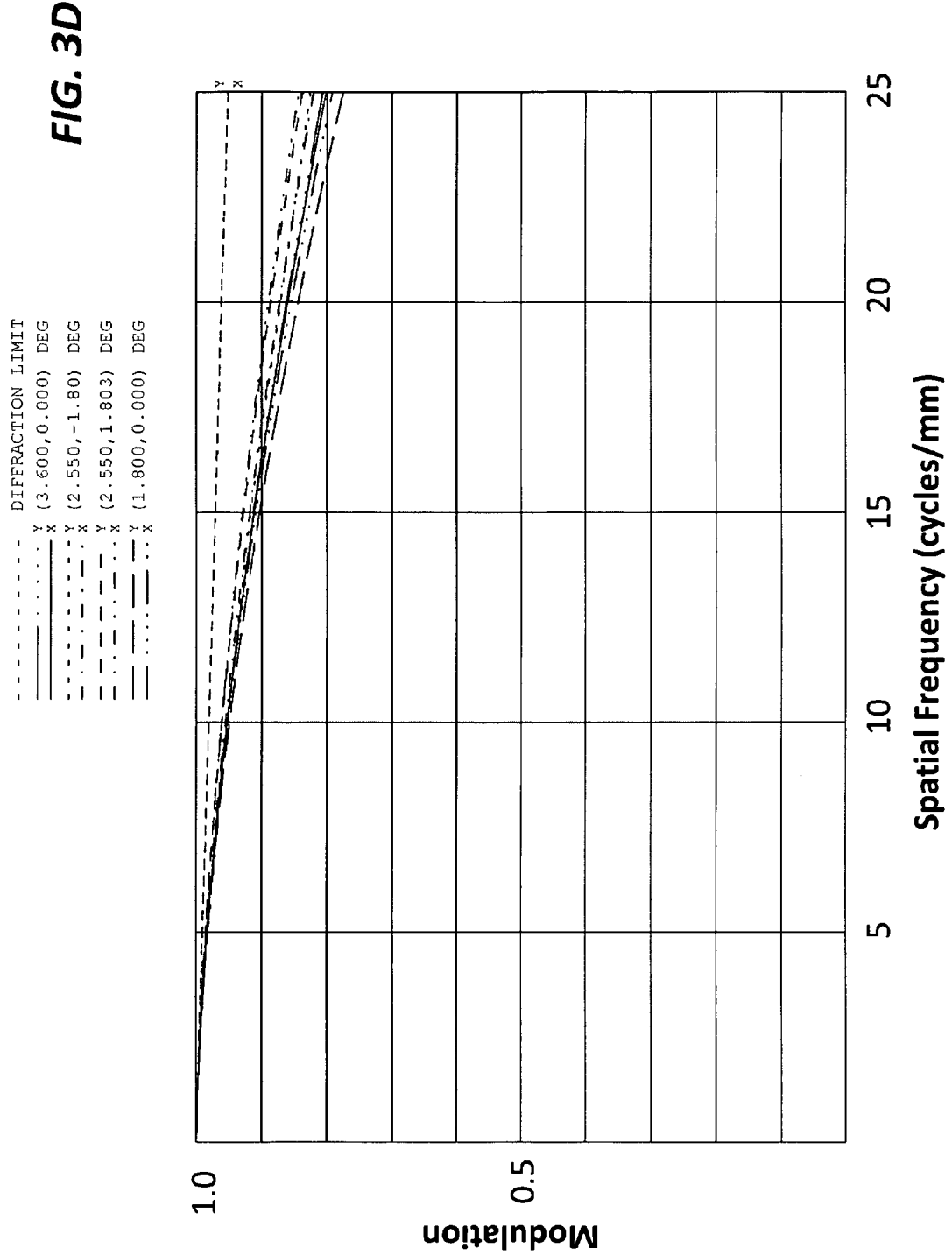
Figure 3E:
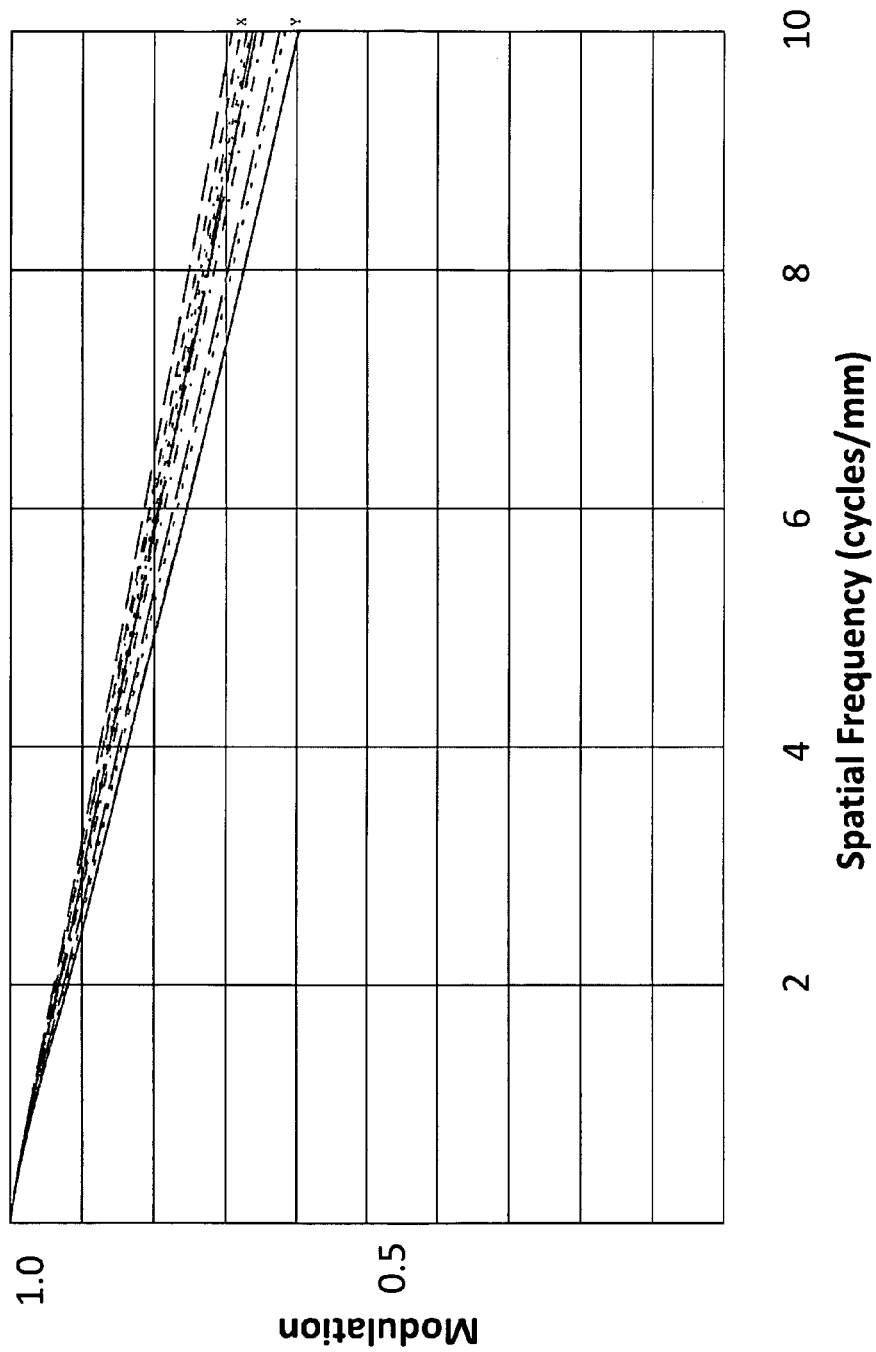
FIG. 3E and FIG. 3F are MTF plots over the field of view for the far infrared waveband for the TMA system of FIGS. 3A and 3B.
Figure 3F:
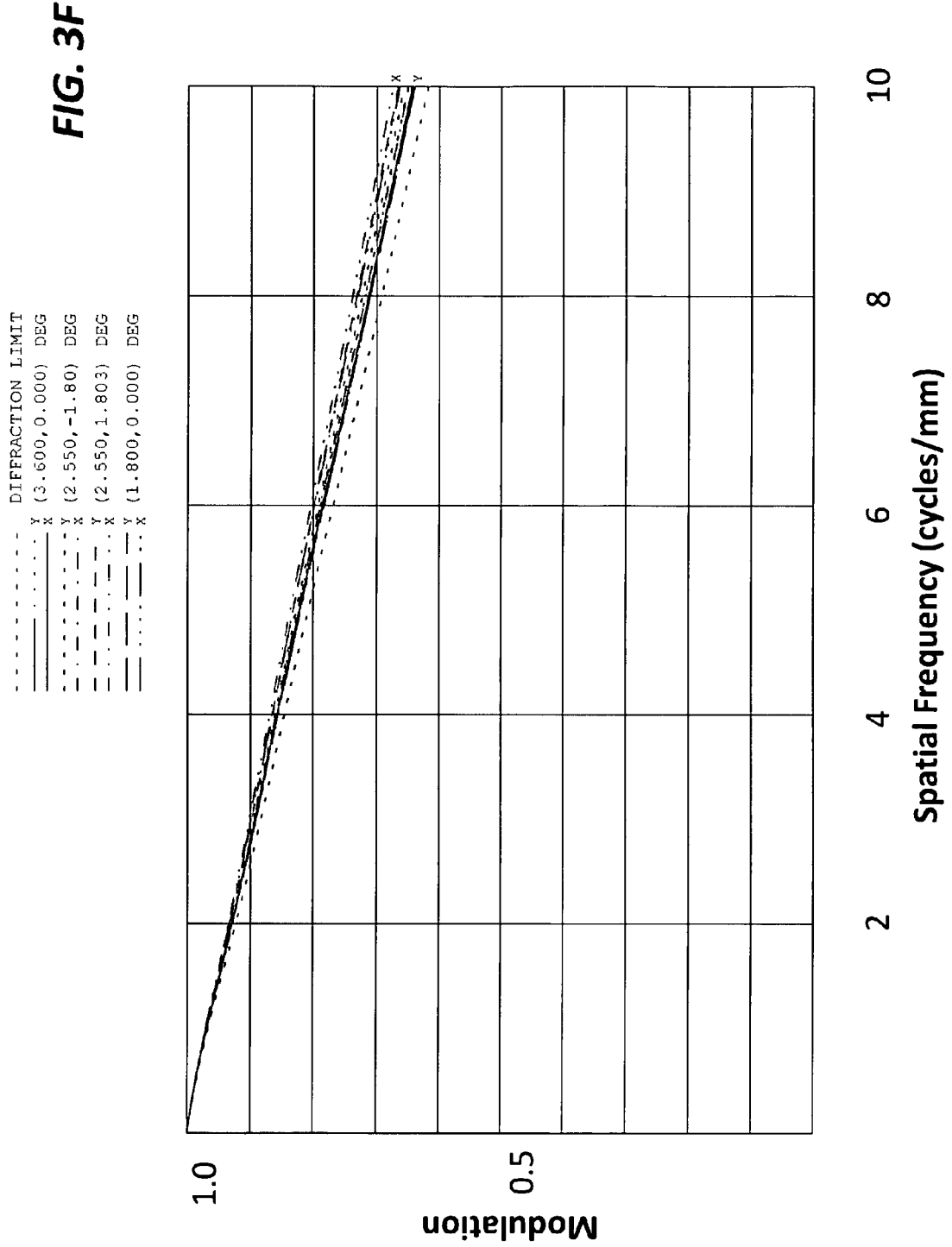

FIG. 3C and FIG. 3D are MTF plots over the field of view for the visible waveband for the TMA system 10 of FIGS. 3A and 3B, while FIG. 3E and FIG. 3F are MTF plots over the field of view for the far infrared waveband for the TMA system of FIGS. 3A and 3B. The MTF plots of FIGS. 3C and 3D show a contrast of greater than about 70% up to 25 cycles/mm, while the MTF plots of FIGS. 3E and 3F show a contrast of greater than 60% up to 10 cycles/mm.

Figure 3G:
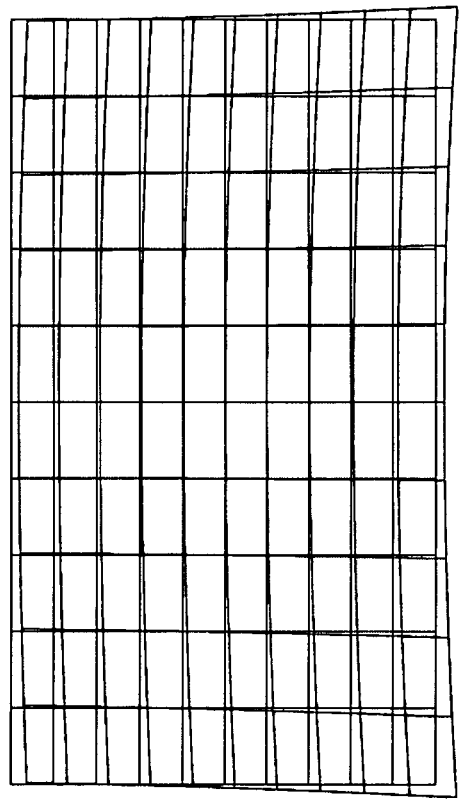
FIG. 3G plots the distortion over the horizontal and vertical FOVs for the TMA system of FIGS. 3A and 3B.

FIG. 3G plots the distortion over the horizontal and vertical FOVs for the objective optical system of FIGS. 3A and 3B, and illustrates moderately good distortion correction over both FOVs with simple shape characteristics that allow for the distortion to be readily corrected by electronic post-processing.

An advantage of the TMA systems disclosed herein is that they can be configured to prevent light LR from a source (not shown) in object space from reflecting off the image sensor IS and back to the object space, where the reflected light may be incident upon the source. This effect is referred to as "signature augmentation." Reduction or elimination of signature augmentation places greater demands on the system to meet all of the requirements simultaneously, especially size and f/number. The TMA systems disclosed herein can meet such stringent requirement because the non-rotationally symmetrical mirror surface shape of at least one of the mirrors.

Figure 3H:
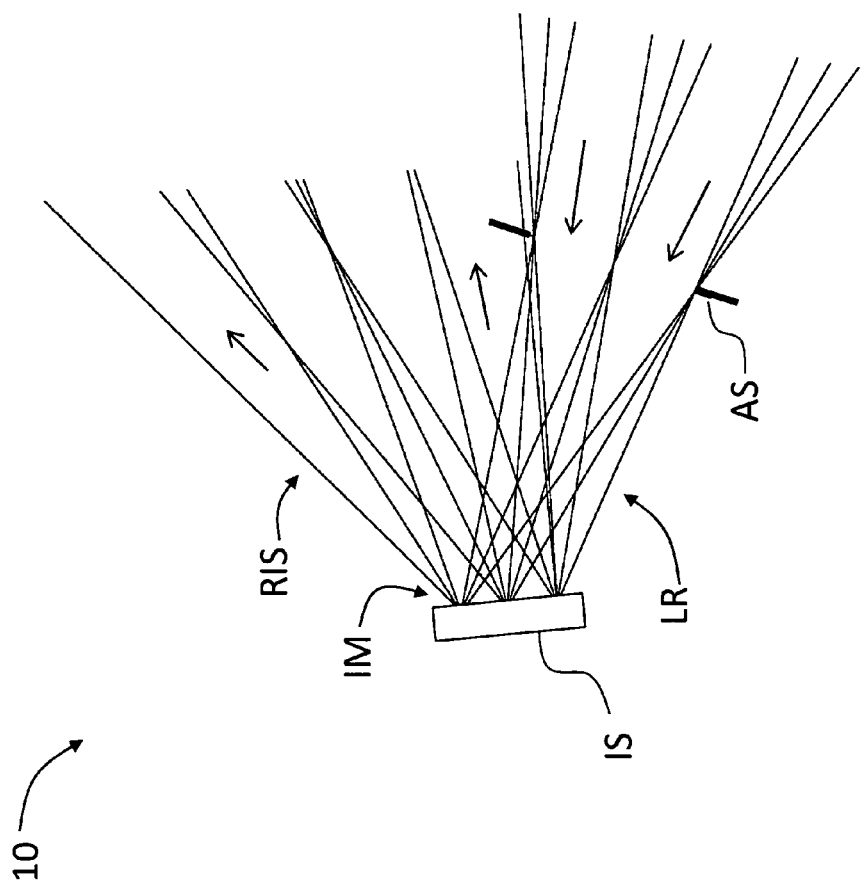
FIG. 3H is a close-up view of a portion of the TMA system of FIGS. 3A and 3B showing light that reflects from the image sensor not passing through the aperture stop.

FIG. 3H is a close-up view of the objective optical system of FIGS. 3A and 3B showing light RIS that reflects from image sensor IS not passing through the aperture stop AS, thereby mitigating signature augmentation.

Embodiment 3

Figure 4A:
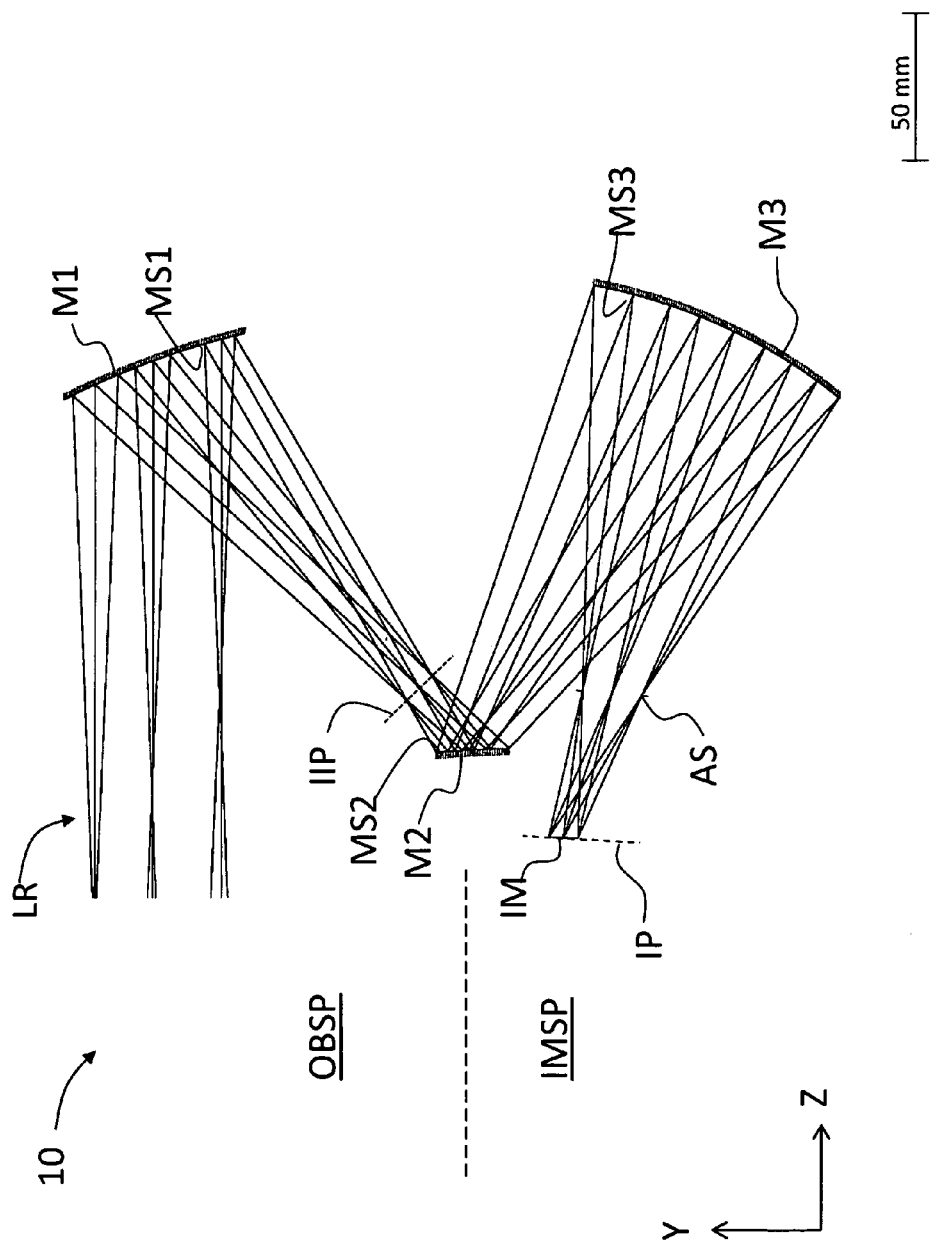
FIG. 4A and FIG. 4B are YZ and XZ schematic diagrams of a third example embodiment of a TMA system operating at a full aperture of approximately f/2.5 and having no signature augmentation and having well-corrected distortion.
Figure 4B:
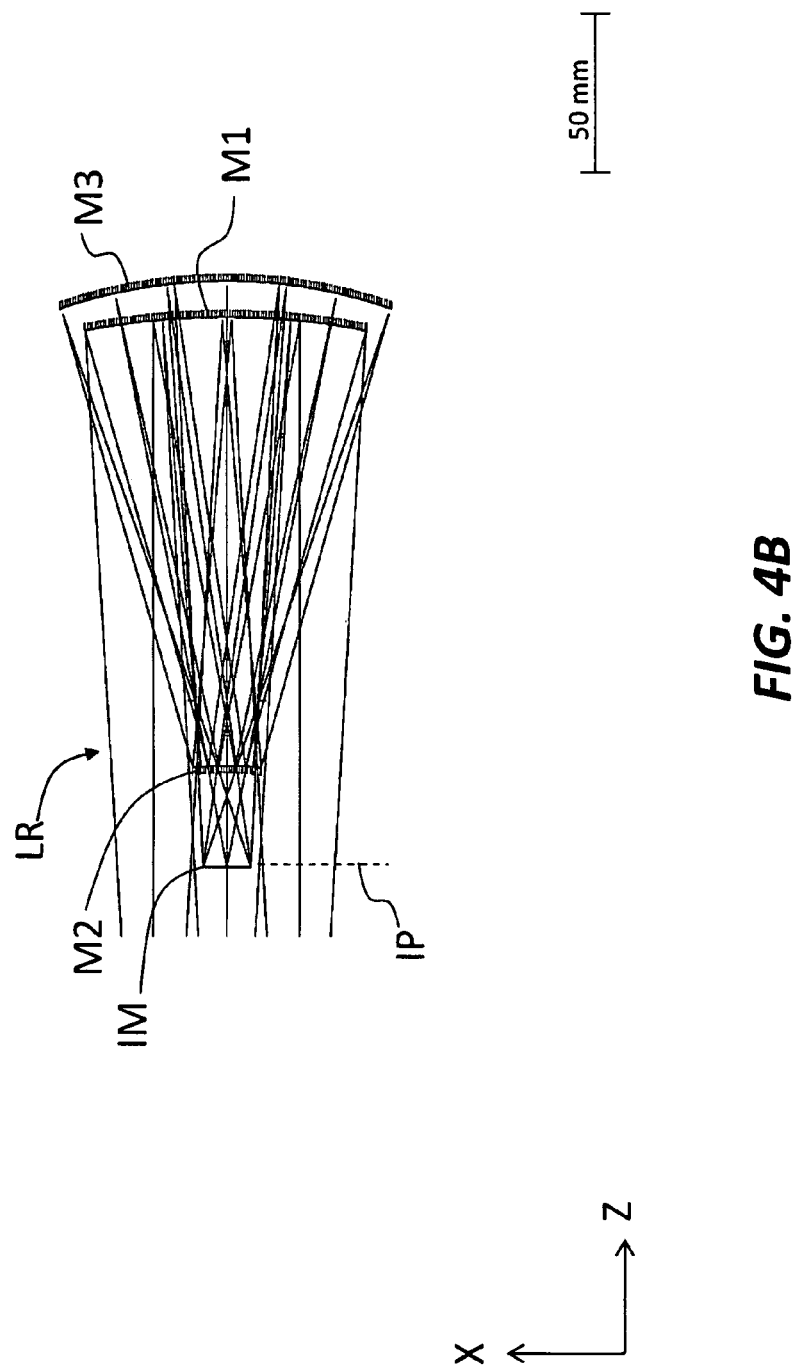

FIG. 4A and FIG. 4B are YZ and XZ schematic diagrams of a third example embodiment of TMA system 10 similar to that of FIGS. 1A and 1B, and operating at a full aperture of approximately f/2.5 and having no signature augmentation and very well corrected distortion.

TABLE 3

THIRD EMBODIMENT LENS DESIGN PRESCRIPTION

| ITEM | RY | RX | XP | YP | ZP | XR | YR | ZR |
|---|---|---|---|---|---|---|---|---|
| OBJ SRF | Flat | Flat | 0.0000 | 0.0000 | Infinity | 0.0000 | 0.0000 | 0.0000 |
| REF SRF | Flat | Flat | 0.0000 | 0.0000 | 0.0000 | 0.0000 | 0.0000 | 0.0000 |
| M1 | −253.6653 | −276.1366 | 0.0000 | −11.0984 | 131.5668 | −11.1381 | 0.0000 | 0.0000 |
| M2 | −393.8576 | −114.4149 | 0.0000 | −22.6815 | −15.6488 | −2.7683 | 0.0000 | 0.0000 |
| M3 | −192.5621 | −185.3762 | 0.0000 | −14.9896 | 146.9573 | −8.1134 | 0.0000 | 0.0000 |
| AS | Flat | Flat | 0.0000 | −28.6287 | 3.7728 | −4.6891 | 0.0000 | 0.0000 |
| IM SRF | Flat | Flat | 0.0000 | −11.4359 | −46.5678 | −1.2254 | 0.0000 | 0.0000 |

The coefficients for mirror M1 are:

| | | | |
|---|---|---|---|
| CY = −0.00394220 | KY = −0.607722 | CX = −0.00362140 | KX = −0.718760 |
| AR = −1.28028E−09 | BR = −6.59389E−17 | CR = −9.64461E−23 | DR = −6.95582E−26 |
| AP = 1.19682E−02 | BP = −6.71175E+00 | CP = −9.25230E+00 | DP = −3.07606E+00 |

The coefficients for mirror M2 are:

| | | | |
|---|---|---|---|
| CY = −0.00253899 | KY = 0.000000 | CX = −0.00874012 | KX = 0.000000 |
| AR = 2.65913E−08 | BR = −2.41052E−10 | CR = 4.59117E−17 | DR = −5.37080E−18 |
| AP = 0.00000E+00 | BP = −8.24633E−01 | CP = −3.08135E+00 | DP = −3.83555E−01 |

The coefficients for mirror M3 are:

| | | | |
|---|---|---|---|
| CY = −0.00519313 | KY = −0.013938 | CX = −0.00539444 | KX = −0.005189 |
| AR = 2.39618E−17 | BR = 6.22804E−23 | CR = −3.86554E−34 | DR = 0.00000E+00 |
| AP = −1.88804E+0 | BP = 6.29043E+02 | CP = 7.57298E+03 | DP = 0.00000E+00 |

The FOVs at the object surface in the object space are 7.6° horizontal in the X axis and 4.8° vertical in Y axis. The full aperture is approximately f/2.5, and the effective focal length is approximately 112 mm.

Figure 4C:
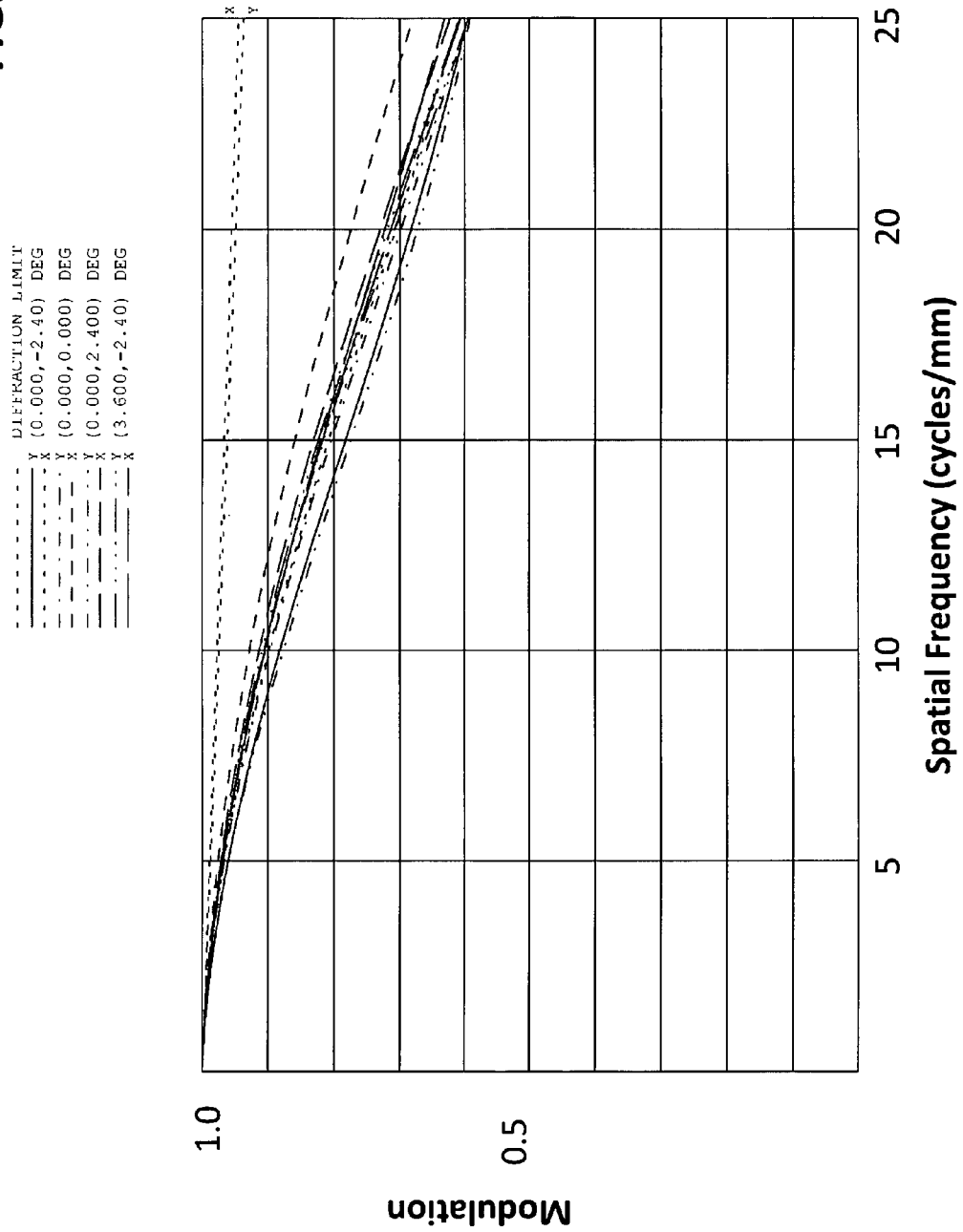
FIG. 4C and FIG. 4D are MTF plots over the field of view for the visible waveband for the TMA system of FIGS. 4A and 4B.
Figure 4D:
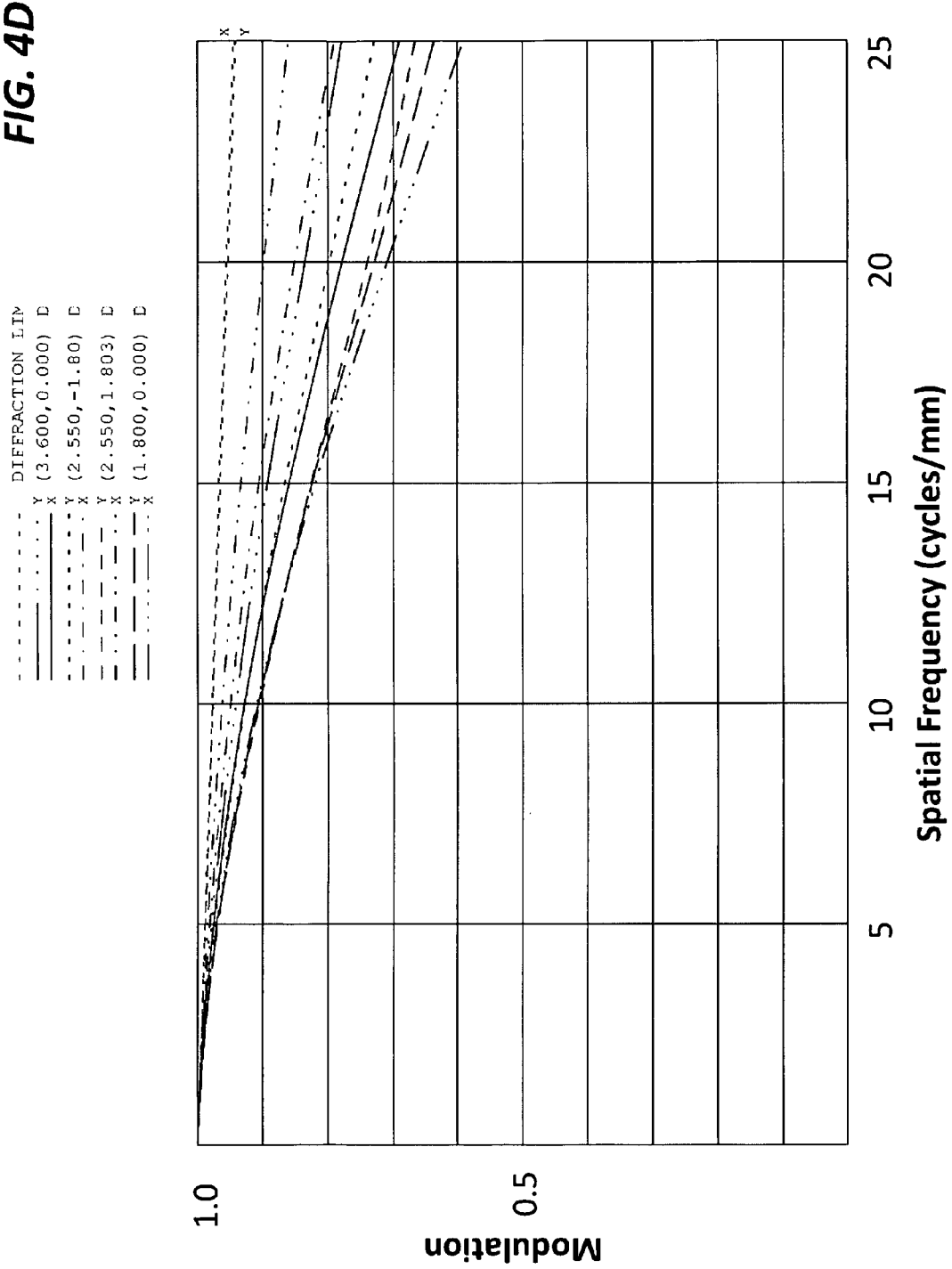
Figure 4E:
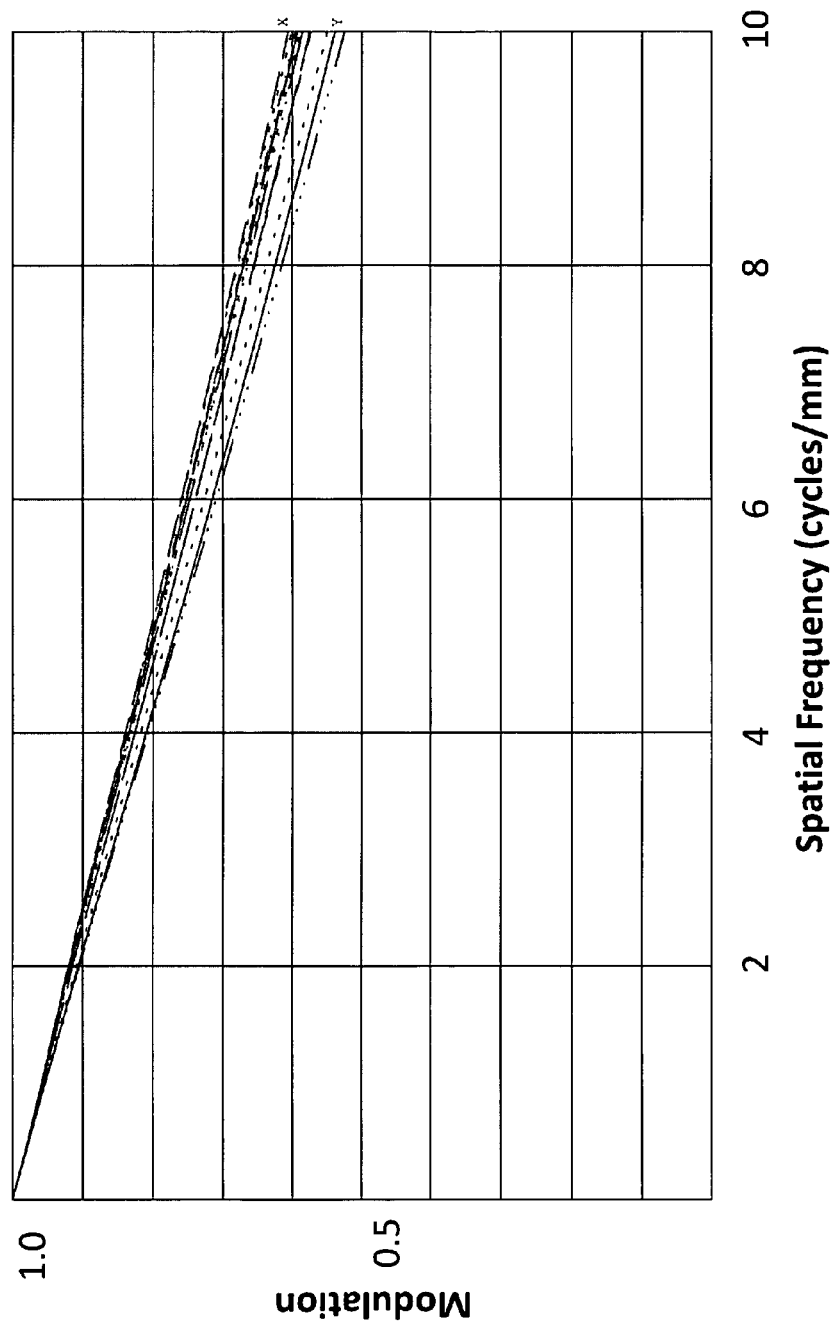
FIG. 4E and FIG. 4F are MTF plots over the field of view for the far infrared waveband for the TMA system of FIGS. 4A and 4B.
Figure 4F:
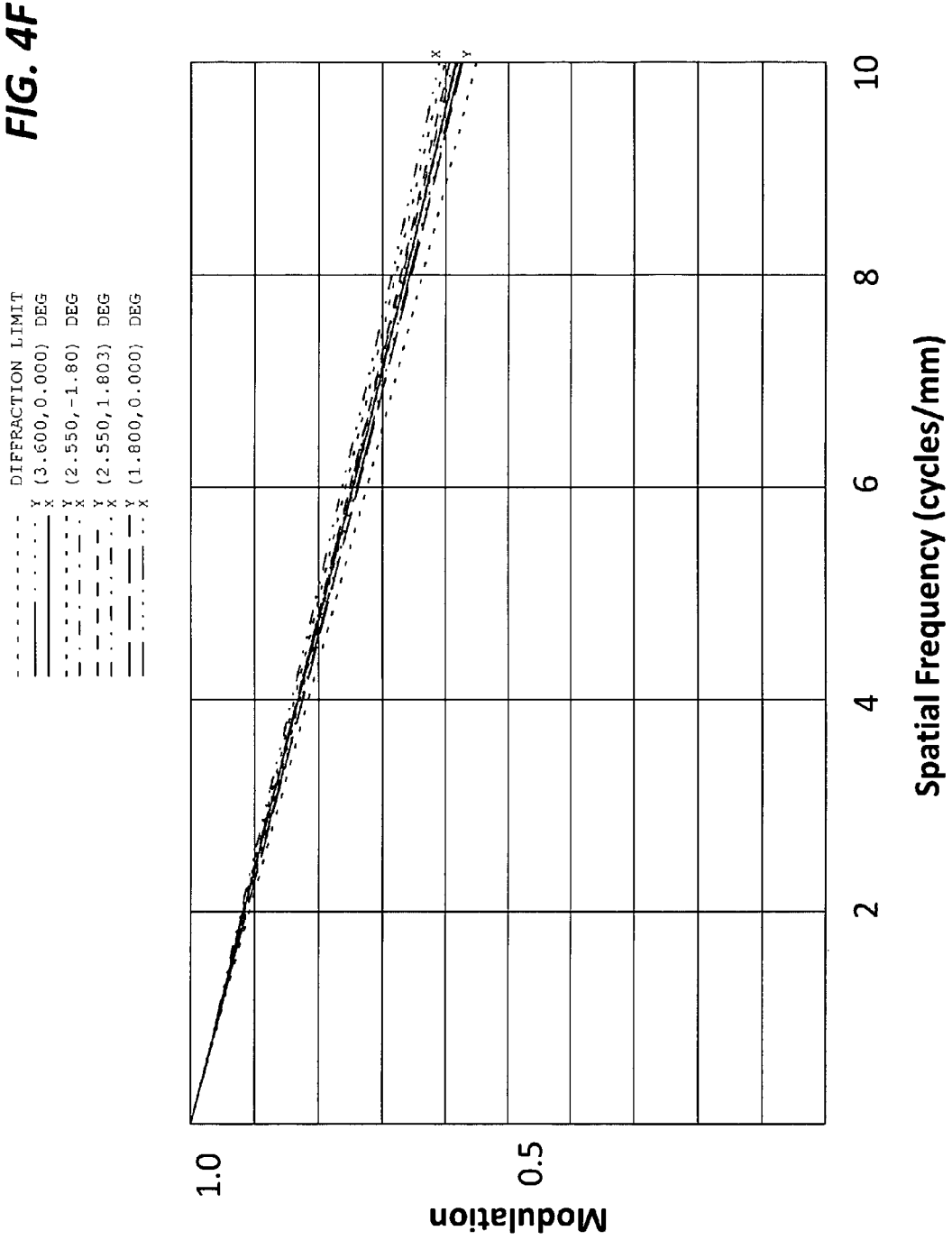

FIG. 4C and FIG. 4D are MTF plots over the field of view for the visible waveband for the TMA system of FIGS. 4A and 4B, while FIG. 4E and FIG. 4F are MTF plots over the field of view for the far infrared waveband for the TMA system of FIGS. 4A and 4B. The MTF plots of FIGS. 4C and 4D show a contrast of greater than about 60% up to 25 cycles/mm, while the MTF plots of FIGS. 3E and 3F show a contrast of greater than 50% up to 10 cycles/mm.

Figure 4G:
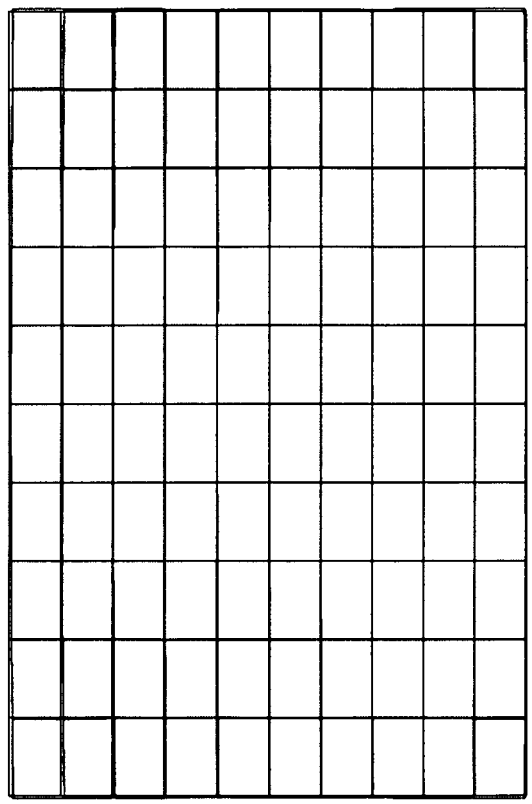
FIG. 4G plots the distortion over the horizontal and vertical FOVs for the TMA system of FIGS. 4A and 4B.

FIG. 4G plots the distortion over the horizontal and vertical FOVs for the TMA system of FIGS. 4A and 4B. The distortion is very well corrected and the little distortion that is present has a signature that allows for the distortion to be readily corrected by electronic post-processing.

Figure 4H:
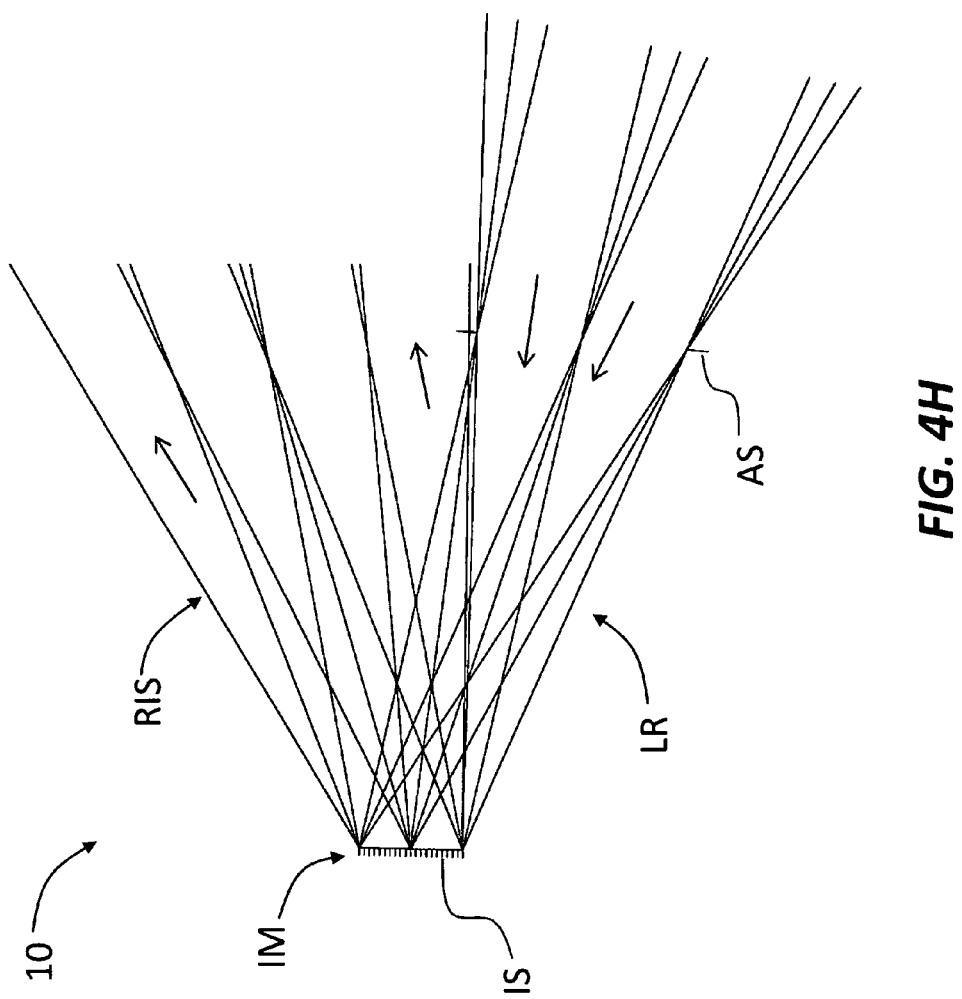
FIG. 4H is a close-up view of a portion of the TMA system of FIGS. 4A and 4B showing light that reflects from the image sensor not passing through the aperture stop.

FIG. 4H is a close-up view of a portion of TMA system 10 of FIGS. 4A and 4B showing light RIS that reflects from image sensor IS not passing through aperture stop AS, thereby mitigating signature augmentation.

Embodiment 4

Figure 5A:
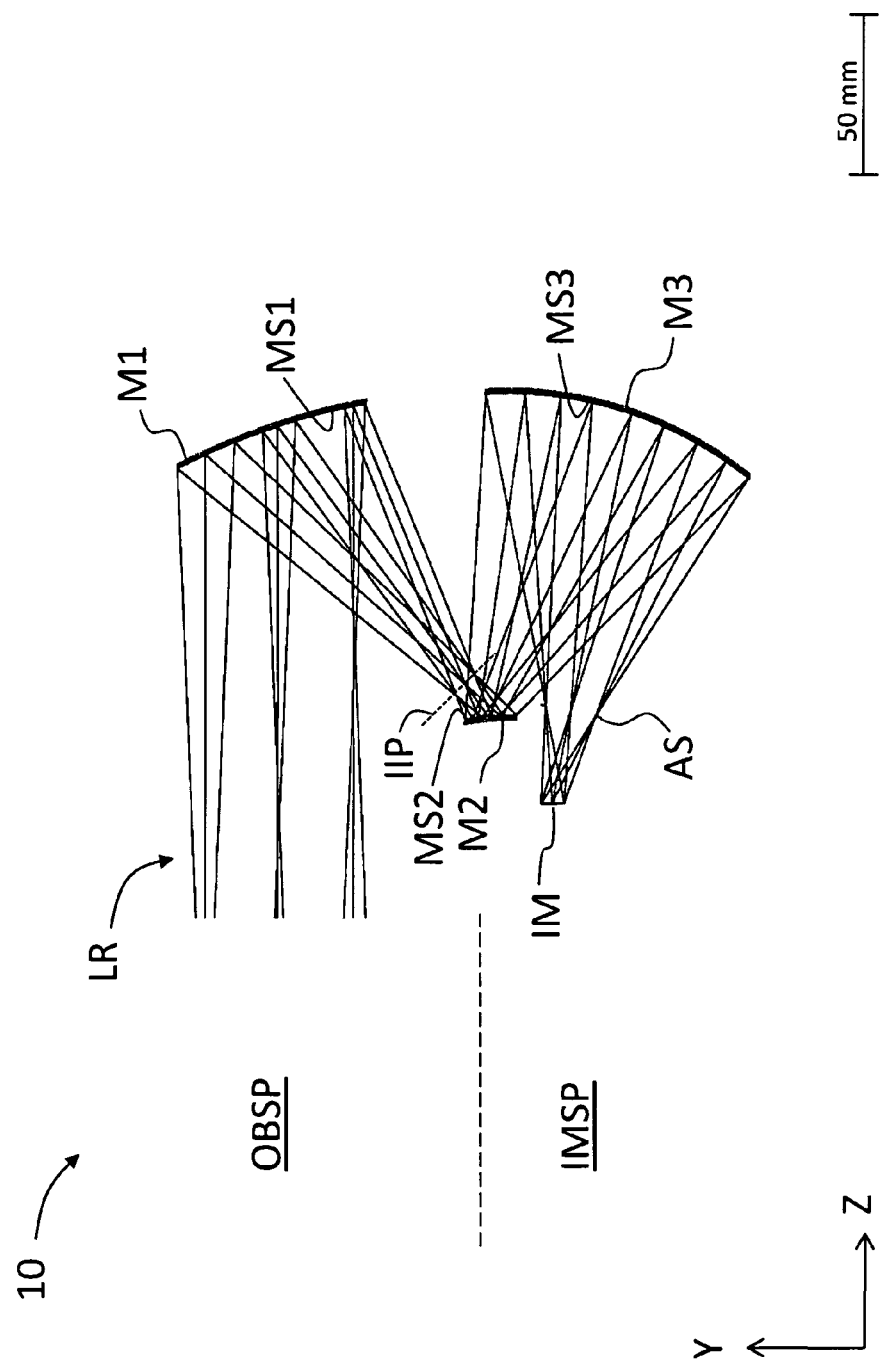
FIG. 5A and FIG. 5B are YZ and XZ schematic diagrams of a fourth example embodiment of a TMA system operating at a full aperture of approximately f/1.8 and optimized to be compact and perform over the medium and far infrared wavebands.
Figure 5B:
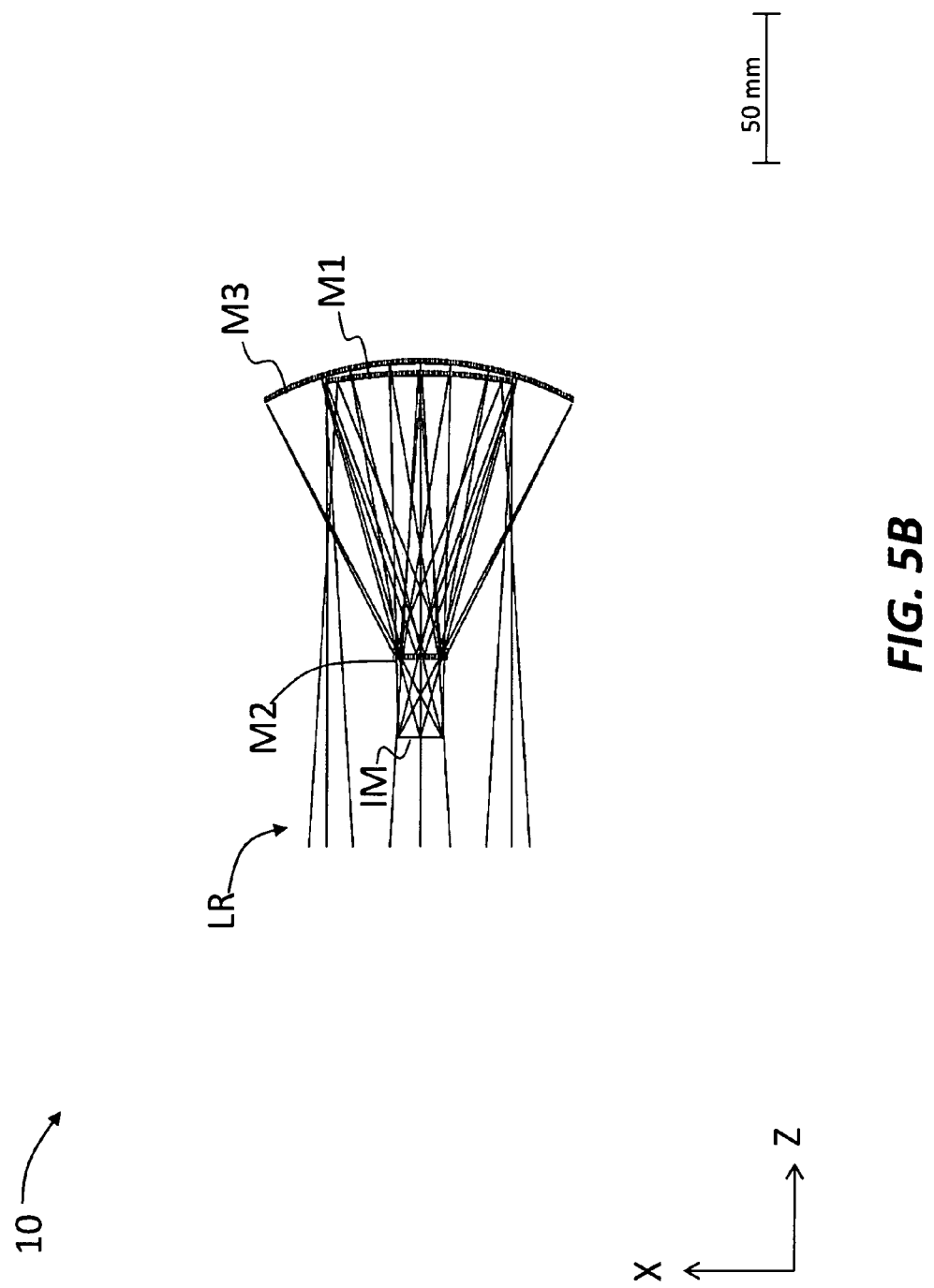

FIG. 5A and FIG. 5B are YZ and XZ schematic diagrams of a fourth example embodiment of TMA system 10 similar to that of FIGS. 1A and 1B, and operating at a full aperture of approximately f/1.8 and optimized to be compact and perform over the medium and far infrared wavebands.

TABLE 4

FOURTH EMBODIMENT LENS DESIGN PRESCRIPTION

| ITEM | RY | RX | XP | YP | ZP | XR | YR | ZR |
|---|---|---|---|---|---|---|---|---|
| OBJ SRF | Flat | Flat | 0.0000 | 0.0000 | Infinity | 0.0000 | 0.0000 | 0.0000 |
| REF SRF | Flat | Flat | 0.0000 | 0.0000 | 0.0000 | 0.0000 | 0.0000 | 0.0000 |
| M1 | −171.3912 | −196.0096 | 0.0000 | −5.0008 | 120.0000 | −10.6433 | 0.0000 | 0.0000 |
| M2 | −114.4991 | −133.8939 | 0.0000 | −7.7837 | 19.2460 | −7.8905 | 0.0000 | 0.0000 |
| M3 | −123.5664 | −118.4367 | 0.0000 | −4.9897 | 122.5445 | −7.6468 | 0.0000 | 0.0000 |
| AS | Flat | Flat | 0.0000 | −8.4589 | 21.4926 | −11.7632 | 0.0000 | 0.0000 |
| IM SRF | Flat | Flat | 0.0000 | −2.2778 | −8.2278 | −0.7611 | 0.0000 | 0.0000 |

The coefficients for mirror M1 are:

| | | | |
|---|---|---|---|
| CY = −0.00583461 | KY = −0.640524 | CX = −0.00510179 | KX = −0.582811 |
| AR = −2.79227E−10 | BR = −2.59858E−16 | CR = −1.39980E−22 | DR = 7.51245E−23 |
| AP = 7.36788E−01 | BP = −6.36398E+00 | CP = −1.12932E+01 | DP = −2.15721E−01 |

The coefficients for mirror M2 are:

| | | | |
|---|---|---|---|
| CY = −0.00873369 | KY = 0.000000 | CX = −0.00746860 | KX = 0.000000 |
| AR = 5.91443E−08 | BR = 4.46178E−10 | CR = −9.72805E−14 | DR = 9.84442E−17 |
| AP = 0.00000E+00 | BP = −8.76109E−01 | CP = −1.52681E−01 | DP = −2.06224E−01 |

The coefficients for mirror M3 are:

| | | | |
|---|---|---|---|
| CY = −0.00809282 | KY = −0.032330 | CX = −0.00844333 | KX = −0.070714 |
| AR = −2.83017E−14 | BR = −3.27997E−13 | CR = 3.61307E−30 | DR = 0.00000E+00 |
| AP = −7.60177E+01 | BP = 1.24651E−01 | CP = 1.37617E+03 | DP = 0.00000E+00 |

The FOVs at the object surface in the object space are 7.6° horizontal in the X axis and 4.8° vertical in Y axis. The full aperture is approximately f/1.8, and the effective focal length is approximately 86 mm.

Figure 5C:
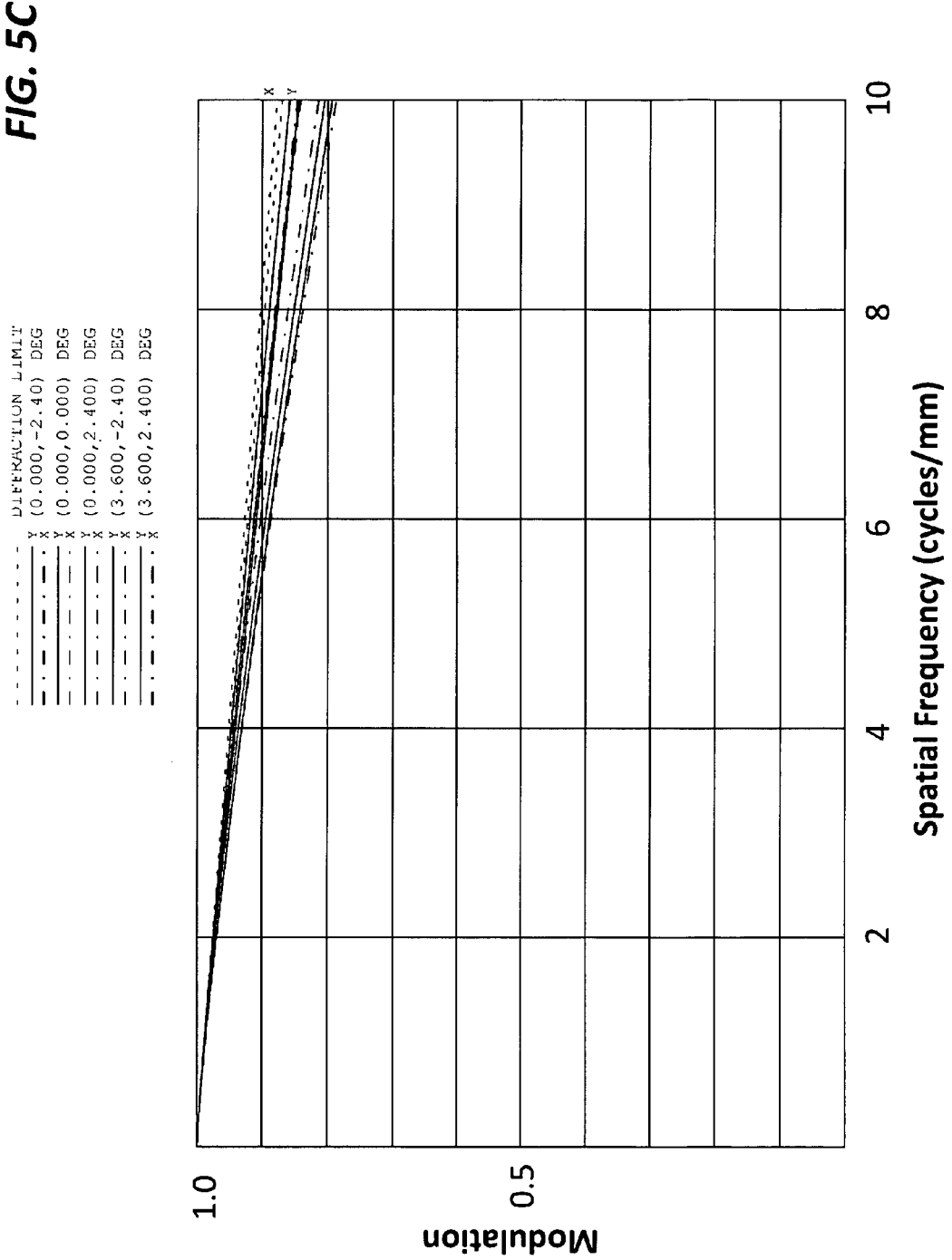
FIG. 5C and FIG. 5D are MTF plots over the field of view for the medium infrared waveband for the TMA system of FIGS. 5A and 5B.
Figure 5D:
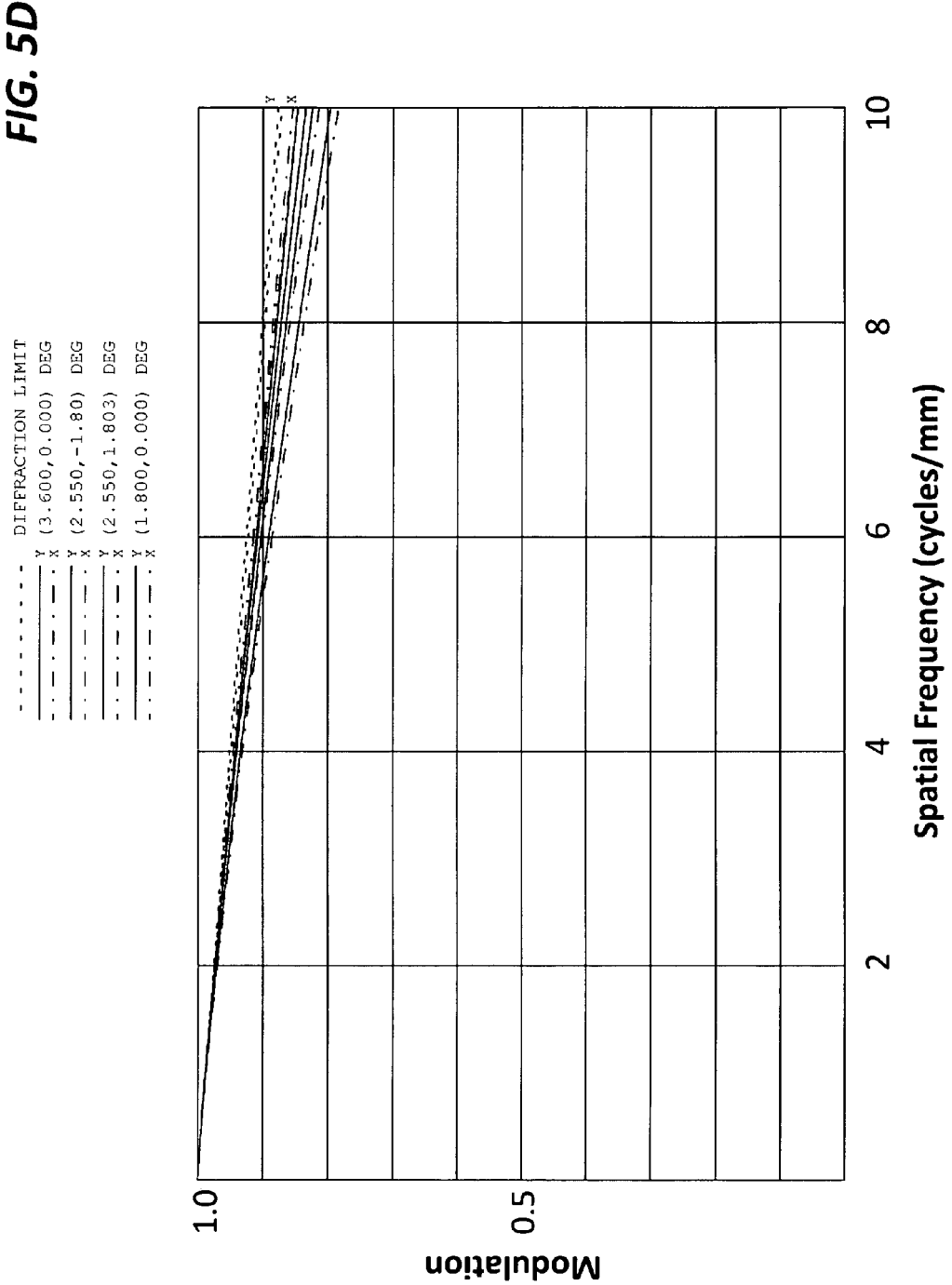
Figure 5E:
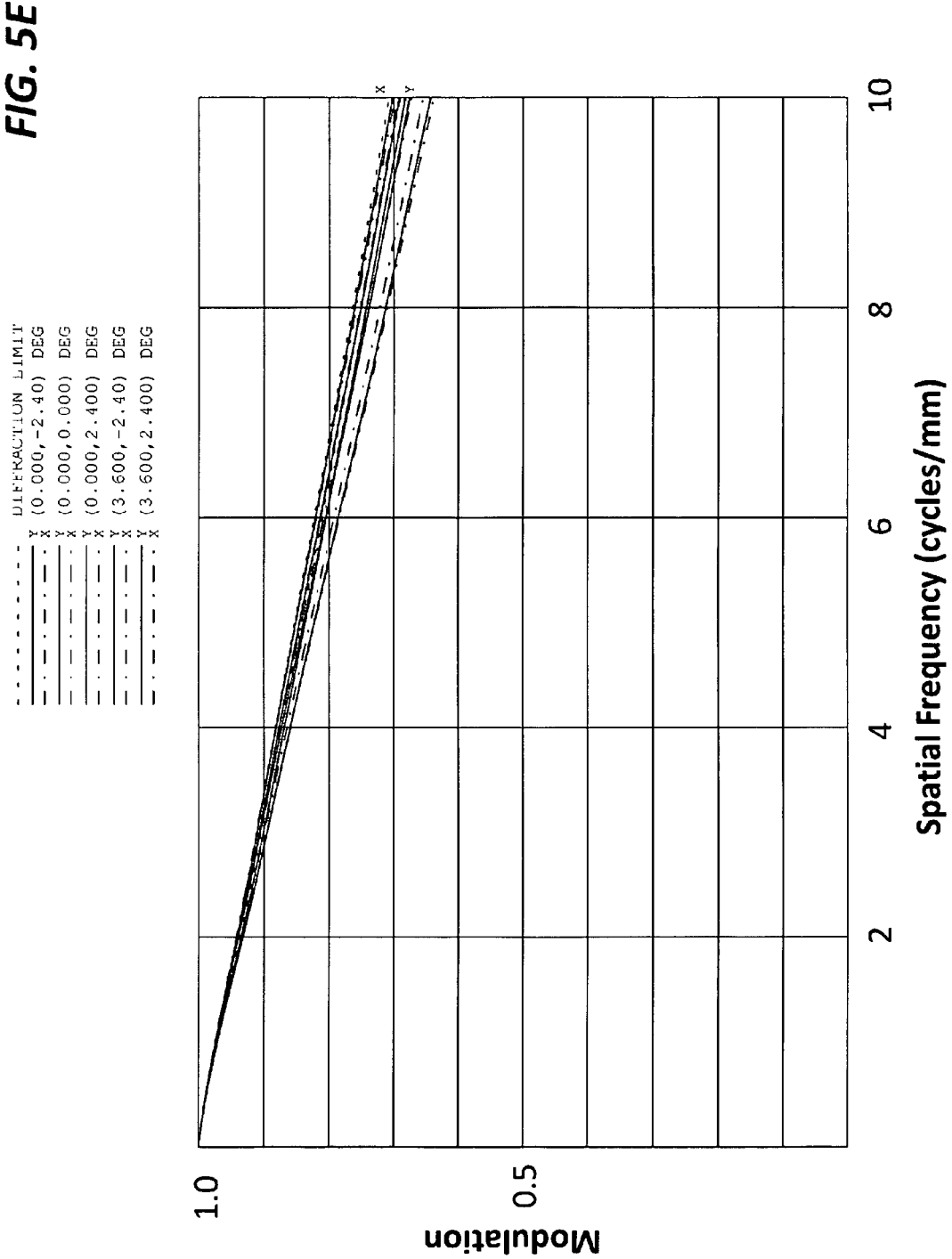
FIG. 5E and FIG. 5F are MTF plots over the field of view for the far infrared waveband for the TMA system of FIGS. 5A and 5B.
Figure 5F:
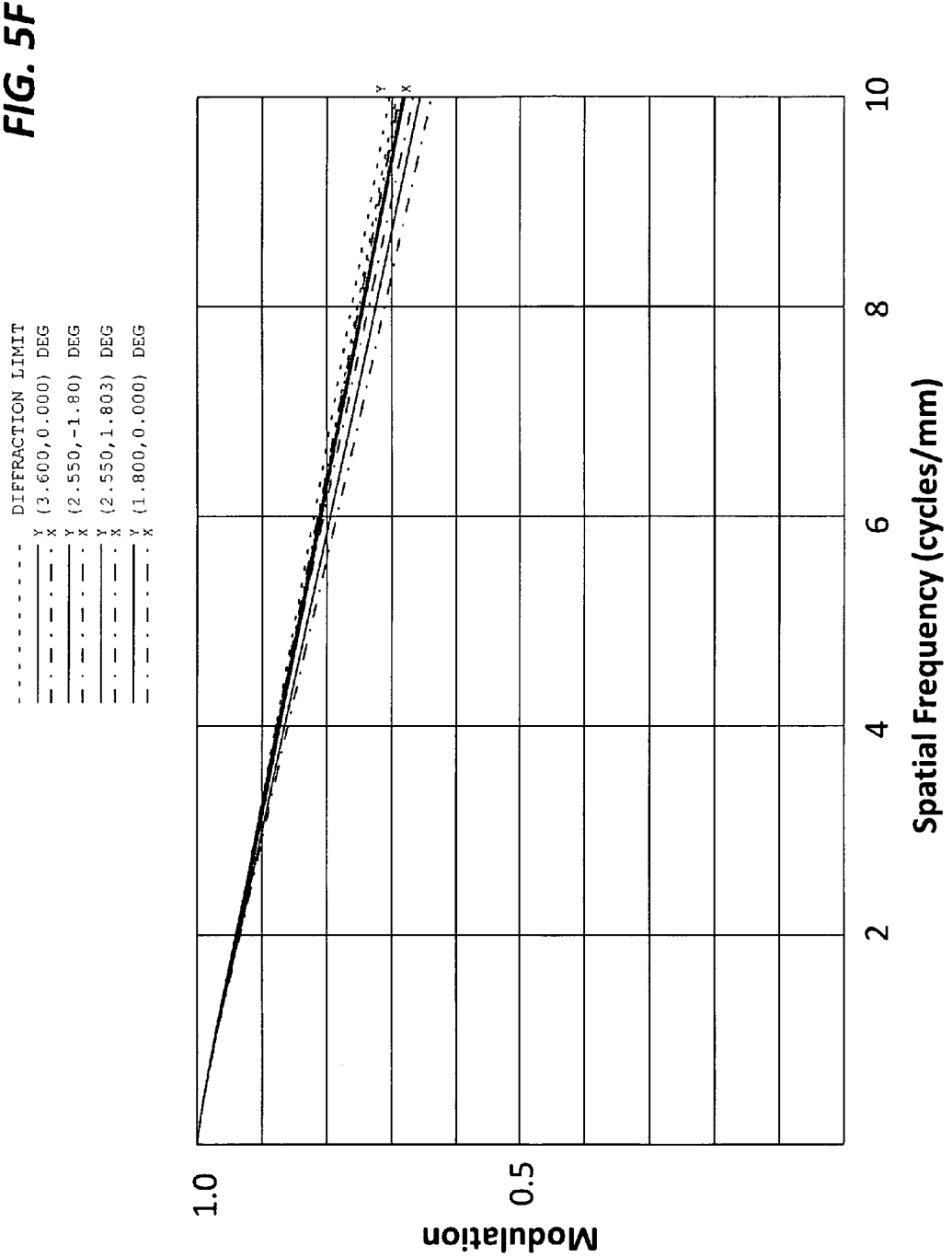

FIG. 5C and FIG. 5D are MTF plots over the field of view for the medium infrared waveband for TMA system 10 of FIGS. 5A and 5B, while FIG. 5E and FIG. 5F are MTF plots over the field of view for the far infrared waveband for the TMA system of FIGS. 5A and 5B. The MTF plots of FIGS. 5C and 5D show a contrast of greater than about 80% up to 10 cycles/mm, while the MTF plots of FIGS. 5E and 5F show a contrast of greater than 60% up to 10 cycles/mm.

Figure 5G:
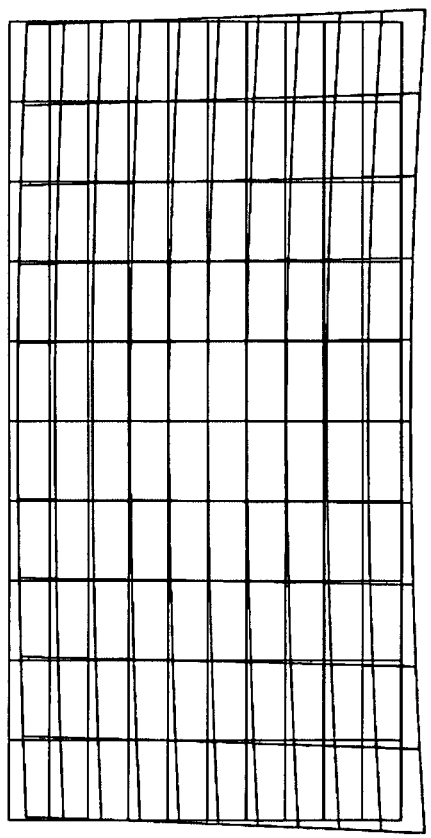
FIG. 5G plots the distortion over the horizontal and vertical FOVs for the TMA system of FIGS. 5A and 5B.

FIG. 5G plots the distortion over the horizontal and vertical FOVs for the objective optical system of FIGS. 5A and 5B, and illustrates moderately good distortion correction over both FOVs, with simple shape characteristics that allow for the distortion to be readily corrected by electronic post-processing.

The above-described embodiments include four example optical designs. It is to be understood that TMA systems having other full apertures, other fields of view, other focal lengths, different numbers of non-rotationally symmetric mirrors, other image sensor sizes with different pixel sizes, and other single or multiple wavebands falling within the scope of the present invention can be achieved by utilizing the design principles described herein and applying conventional optical design optimization to obtain a design fulfilling the performance criteria. In this way, a broad range of TMA systems having all the advantages described above in connection with the specific example embodiments can be realized.

Thus, it will be apparent to those skilled in the art that various modifications and variations can be made to the present disclosure without departing from the spirit and scope of the disclosure. Thus it is intended that the present disclosure cover the modifications and variations of this disclosure provided they come within the scope of the appended claims and their equivalents.

What is claimed is:

1. A reflective objective optical system for forming an image at a first image plane of an object in an object space for light rays having at least one waveband, consisting of:
    a first mirror, a second mirror and a third mirror arranged in three-mirror anastigmat configuration and having respective first, second and third reflective surfaces that reflect the light rays from the object to the image in order from the first reflective surface to the second reflective surface to the third reflective surface, wherein the light rays include central rays that are substantially parallel when incident upon the first mirror and that are not substantially parallel when reflecting from the third mirror;
    at least one intermediate image location between the first and third mirrors and where at least one intermediate image is formed; and
    wherein the first, second and third reflective surfaces have different toroidal non-rotationally symmetric asphere shapes, with the first, second and third reflective surfaces having respective centers of curvatures that do not lie along a common axis.

2. An objective optical system according to claim 1, wherein at least one of the mirrors is an electroformed mirror, and wherein the at least one non-rotationally symmetric reflective surface is formed on the at least one electroformed mirror.

3. An objective optical system according to claim 1, further consisting of an aperture stop between the first image plane and the third mirror.

4. An objective optical system according to claim 3, further comprising:
    a beamsplitter disposed either between the first image plane and the aperture stop or between the aperture stop and the third mirror, the beamsplitter forming a second image plane; and
    first and second image sensors respectively disposed at the first and second image planes.

5. An objective optical system according to claim 1, wherein a chief ray of an axial field beam is substantially perpendicular to the first image plane.

6. An objective optical as claimed in claim 1, further comprising a cold stop disposed at the aperture stop location.

7. An objective optical system according to claim 1, wherein the at least one waveband includes one of:
    a visible waveband in the range of 450 nm to 650 nm;
    a near-infrared wavelength band in the range of 700 nm to 1,200 nm;
    a mid-infrared waveband in the range 3 μm to 5 μm;
    a far-infrared waveband in the range 8 μm to 12 μm;
    an ultra-violet waveband in the range from 20 nm to 400 nm;
    an extreme ultraviolet waveband that includes a 13.5 nm wavelength; and
    an X-ray waveband having wavelengths less than 13.5 nm.

8. An objective optical system according to claim 1, where the at least one waveband includes two or more wavelength bands selected from the group of wavelength bands comprising: visible, near infrared, mid-infrared and far infrared.

9. An objective optical system according to claim 1, further comprising a field stop located substantially at the at least one intermediate image location.

10. An objective optical system according to claim 1, further consisting of:
    a first image sensor disposed at the first image plane; and
    processing electronics electrically connected to the first image sensor.

11. An objective optical system according to claim 10, further comprising:
    a beamsplitter arranged between the first image plane and the third mirror and configured to form a second image plane; and
    a second image sensor disposed at the second image plane and electrically connected to the processing electronics.

12. An optical objective system for forming an image of an object from light rays having central rays, consisting of:
    first, second and third mirrors having respective first, second and third reflective surfaces, the mirrors being arranged in a three mirror anastigmat configuration, wherein the central rays are substantially parallel when incident upon the first reflective surface and wherein the central rays are not substantially parallel when reflecting from the third reflective surface;
    an intermediate image location between the first and second mirrors; and
    wherein the first, second and third mirrors have toroidal non-rotationally symmetric asphere surfaces, and wherein the surfaces have respective centers of curvatures that do not lie along a common axis.

13. An optical objective system according to claim 12, wherein the at least two toroidal non-rotationally symmetric asphere surfaces are supported by respective electroformed shells.

14. An optical objective system according to claim 13, further comprising a beamsplitter arranged so that the system includes first and second image planes associated with different wavebands.

15. An optical objective system according to claim 14, further comprising:
- a first image sensor arranged at the first image plane;
- a second image sensor arranged at the second image plane; and
- processing electronics electrically connected to the first and second image sensors.

16. An optical objective system according to claim 12, further comprising at least one of:
- a field stop located substantially at an intermediate image location; and
- a cold stop arranged at an aperture stop location downstream of the third mirror.

17. An optical objective system according to claim 12, configured to image at least one of:
- a visible and at least one infrared waveband; and
- at least two different infrared wavebands.

18. An optical objective system of claim 12, wherein all three mirrors are electroformed mirrors.

* * * * *